(12) United States Patent
Poulsen

(10) Patent No.: US 7,619,824 B2
(45) Date of Patent: Nov. 17, 2009

(54) VARIABLE OPTICAL ARRAYS AND VARIABLE MANUFACTURING METHODS

(75) Inventor: Peter D. Poulsen, Grants Pass, OR (US)

(73) Assignee: Merlin Technology Limited Liability Company, Grant Pass, OR (US)

( * ) Notice: Subject to any disclaimer, the term of this patent is extended or adjusted under 35 U.S.C. 154(b) by 60 days.

(21) Appl. No.: 11/829,055

(22) Filed: Jul. 26, 2007

(65) Prior Publication Data

US 2008/0043326 A1 Feb. 21, 2008

Related U.S. Application Data

(63) Continuation-in-part of application No. 10/993,423, filed on Nov. 18, 2004, now Pat. No. 7,268,950.

(60) Provisional application No. 60/523,076, filed on Nov. 18, 2003.

(51) Int. Cl.
  *G02B 27/14* (2006.01)
  *G03B 21/60* (2006.01)
(52) U.S. Cl. .............................. 359/621; 359/455
(58) Field of Classification Search ......... 359/618–626, 359/454–459
See application file for complete search history.

(56) References Cited

U.S. PATENT DOCUMENTS

| | | | |
|---|---|---|---|
| 1,279,262 A | 9/1918 | Clark | |
| 1,535,985 A | 4/1925 | Clark | |
| 1,550,880 A | 8/1925 | Clark | |
| 2,381,614 A | 8/1945 | Moller et al. | |
| 2,552,455 A | 5/1951 | Pond | |
| 3,087,375 A | 4/1963 | Papke | |
| 3,263,561 A | 8/1966 | Jackson | |
| 3,502,389 A | 3/1970 | Hilborn | |
| 3,622,223 A | 11/1971 | Brakell | |
| 3,712,708 A | 1/1973 | Brown | |
| 3,994,562 A | 11/1976 | Holzel | |
| 4,006,965 A | 2/1977 | Takada et al. | |
| 4,022,522 A | 5/1977 | Rain | |
| 4,025,160 A | 5/1977 | Martinez | |
| 4,040,717 A | 8/1977 | Cinque et al. | |
| 4,068,922 A | 1/1978 | Dotsko | |
| 4,089,587 A | 5/1978 | Schudel | |
| 4,190,320 A | 2/1980 | Ferro | |

(Continued)

FOREIGN PATENT DOCUMENTS

JP    A-2003-66537    3/2003

OTHER PUBLICATIONS

PCT International Search Report; PCT/US04/39384; Dec. 8, 2005; 4 pgs.

(Continued)

*Primary Examiner*—Alicia M Harrington
(74) *Attorney, Agent, or Firm*—Conley Rose, P.C.; Kristin Jordan Harkins

(57) ABSTRACT

The invention divides the lens focusing process into two or more surfaces that incorporate multiple curved axial optic elements on each surface. The axial optics may be manufactured by molding, machining, or by suspended film. If suspended film is used, then both sides of an optic may have a suspended film that is transparent. Alternatively, one side of the suspended film optic may use a reflective film.

18 Claims, 33 Drawing Sheets

U.S. PATENT DOCUMENTS

| | | | |
|---|---|---|---|
| 4,191,451 A | 3/1980 | Hodges | |
| 4,206,969 A | 6/1980 | Cobb et al. | |
| 4,235,513 A | 11/1980 | Vlahos | |
| 4,297,001 A | 10/1981 | Antes et al. | |
| 4,298,246 A | 11/1981 | Iwamura | |
| 4,338,165 A | 7/1982 | Vlahos | |
| 4,458,251 A | 7/1984 | Bondon | |
| 4,606,609 A | 8/1986 | Hong | |
| 4,767,186 A | 8/1988 | Bradley, Jr. et al. | |
| 4,911,529 A | 3/1990 | Van De Ven | |
| 5,112,121 A | 5/1992 | Chang et al. | |
| 5,210,641 A | 5/1993 | Lewis | |
| 5,296,965 A | 3/1994 | Uetsuki et al. | |
| 5,335,022 A | 8/1994 | Braun et al. | |
| 5,541,769 A | 7/1996 | Ansley et al. | |
| 5,581,605 A | 12/1996 | Murakami et al. | |
| 5,625,489 A | 4/1997 | Glenn | |
| 6,040,941 A | 3/2000 | Miwa et al. | |
| 6,081,380 A | 6/2000 | Ohshima et al. | |
| 6,212,011 B1 | 4/2001 | Lissotschenko et al. | |
| 6,252,216 B1 | 6/2001 | Ohashi | |
| 6,381,071 B1 | 4/2002 | Dona et al. | |
| 6,384,970 B1 | 5/2002 | Abe et al. | |
| 6,411,439 B2 | 6/2002 | Nishikawa | |
| 6,570,706 B2 | 5/2003 | Atchison et al. | |
| 6,624,934 B1 * | 9/2003 | Moshrefzadeh et al. | 359/457 |
| 6,873,384 B2 | 3/2005 | Yamanaka et al. | |
| 6,914,725 B2 | 7/2005 | Fujita | |
| 6,932,476 B2 | 8/2005 | Sudo et al. | |
| 6,940,653 B2 | 9/2005 | Favalora et al. | |
| 7,180,663 B2 | 2/2007 | Collender et al. | |

OTHER PUBLICATIONS

PCT Written Opinion of the International Searching Authority; PCT/US04/39384; Dec. 8, 2005; 3 pgs.

English translation of Official Action issued with respect to Japanese Patent Application No. 2006-541668; dated Aug. 7, 2009; 4 pages.

English language Abstract of JP-A-2003-66537 originally published Mar. 5, 2003; 1 page.

Computer generated English translation of JP-A-2003-66537 originally published Mar. 5, 2003; 33 pp.

* cited by examiner

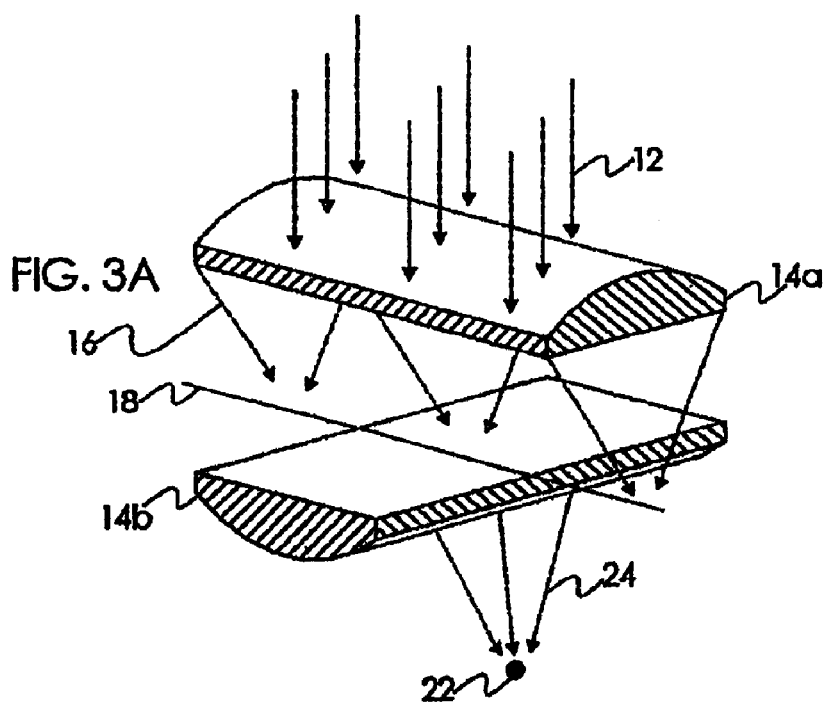
FIG. 3A
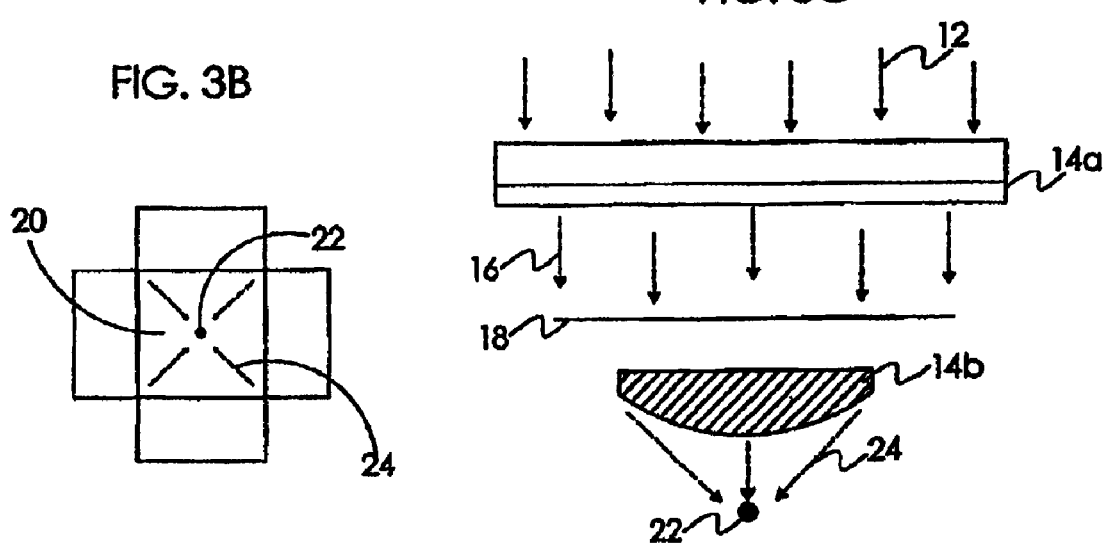
FIG. 3B
FIG. 3C

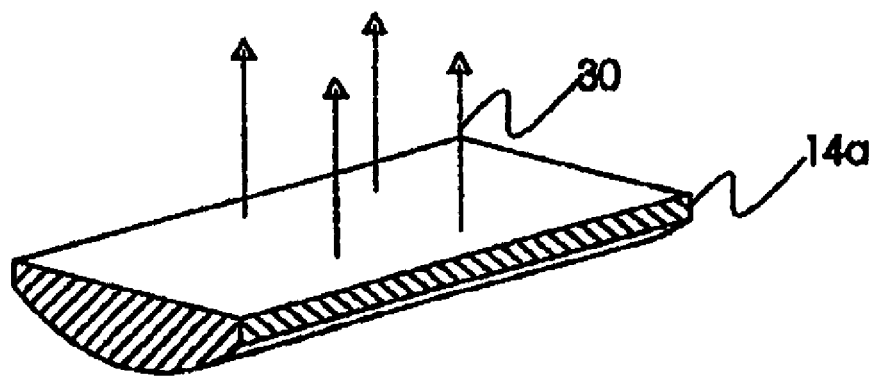
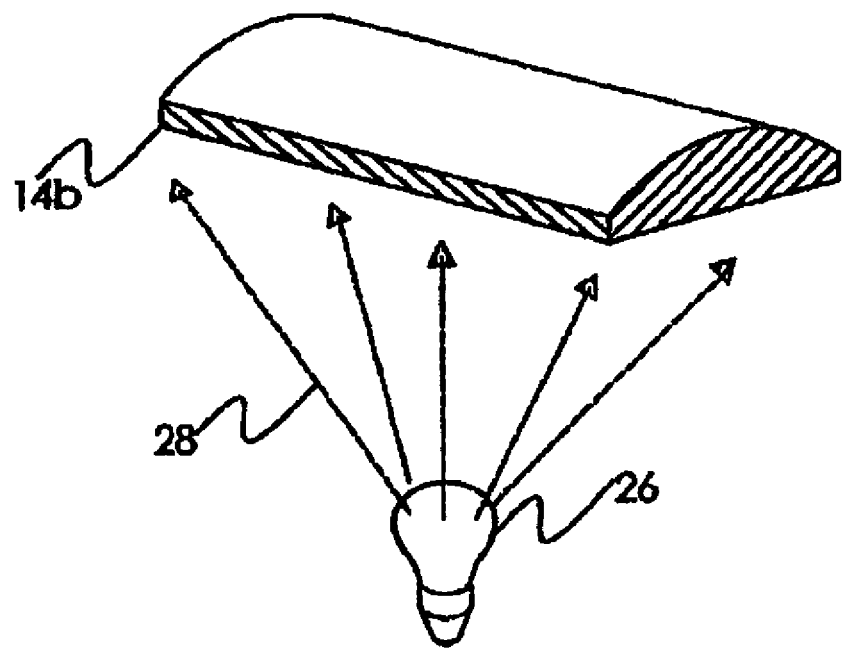
FIG. 4

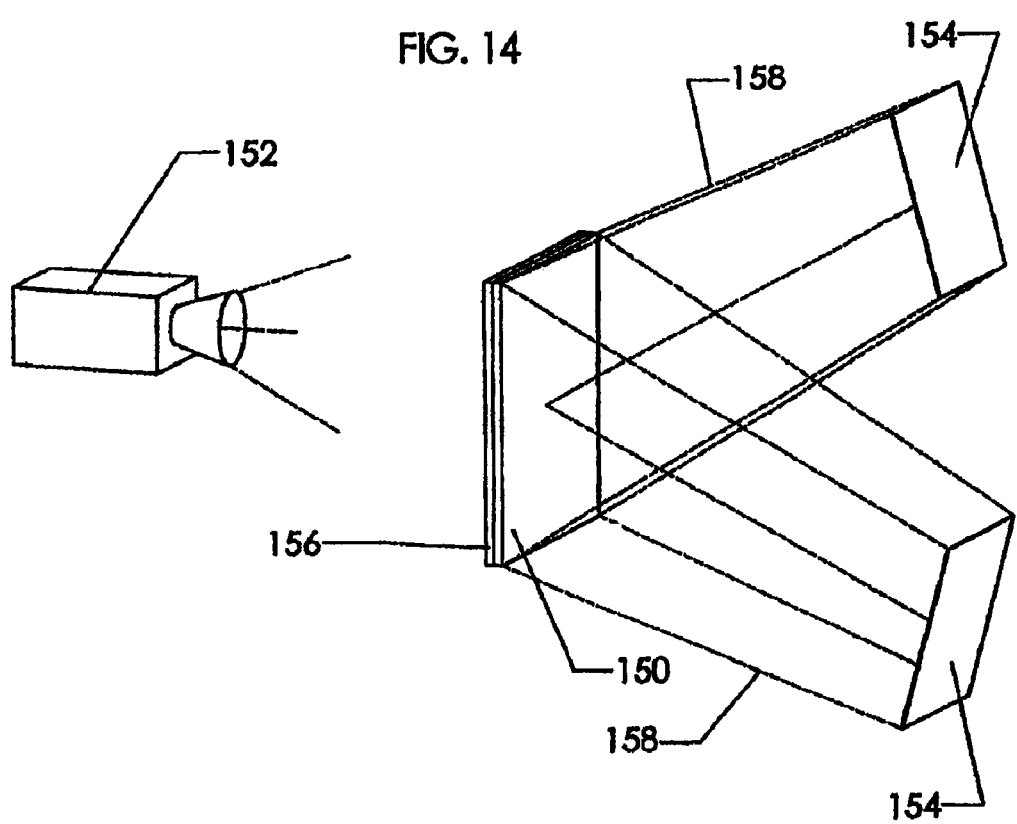

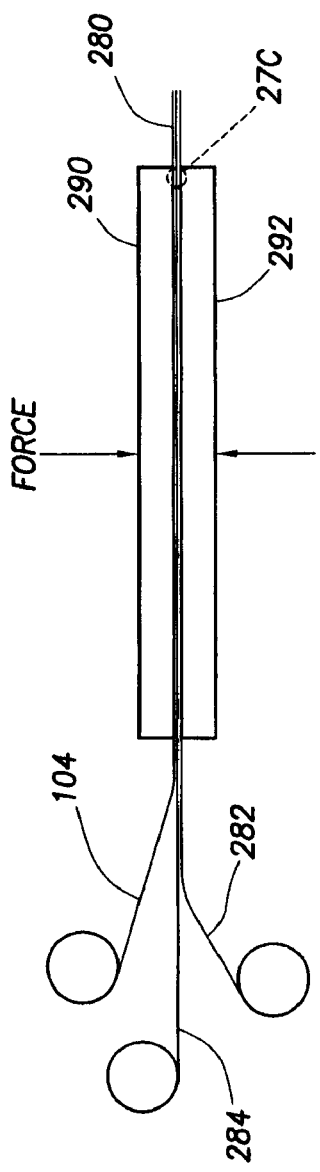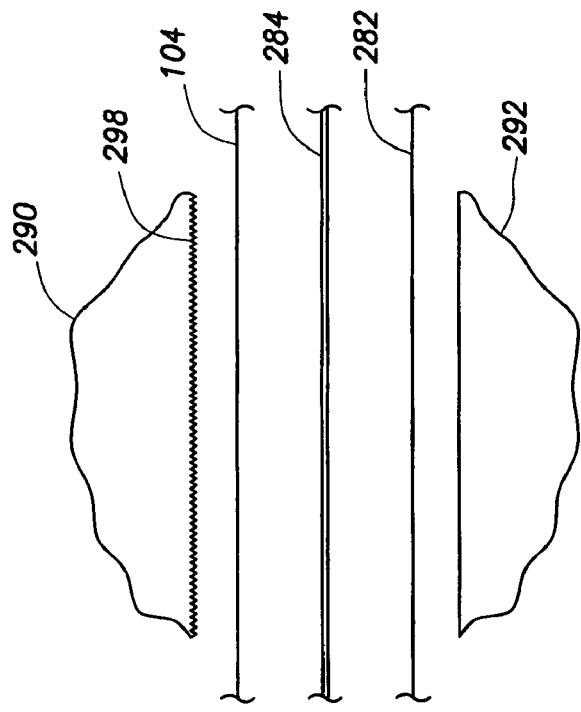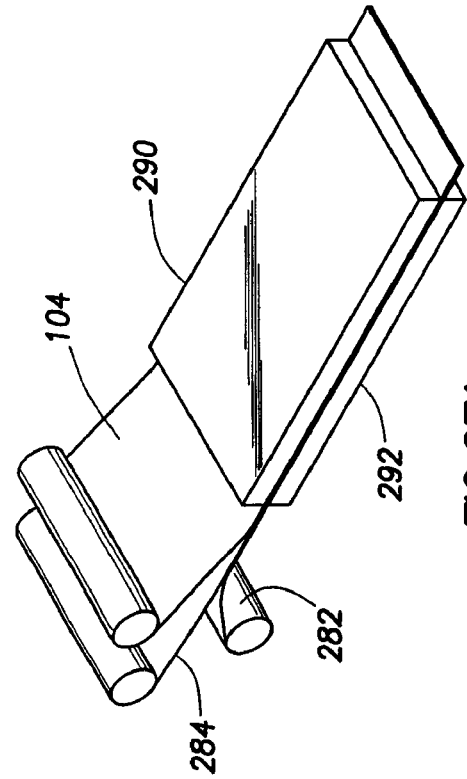
FIG. 27A
FIG. 27B
FIG. 27C

| Path | Alpha | | |
|---|---|---|---|
| mm | 0.2 | 0.4 | 0.7 |
| 1 | 1.00 | 1.00 | 1.00 |
| 1.1 | 1.02 | 1.04 | 1.07 |
| 1.2 | 1.04 | 1.08 | 1.15 |
| 1.3 | 1.06 | 1.13 | 1.23 |
| 1.4 | 1.08 | 1.17 | 1.32 |
| 1.5 | 1.11 | 1.22 | 1.42 |
| 1.6 | 1.13 | 1.27 | 1.52 |
| 1.7 | 1.15 | 1.32 | 1.63 |
| 1.8 | 1.17 | 1.38 | 1.75 |
| 1.9 | 1.20 | 1.43 | 1.88 |
| 2 | 1.22 | 1.49 | 2.01 |
| 5.5 | 2.46 | 6.05 | 23.34 |

VARIABLE OPTICAL ARRAYS AND VARIABLE MANUFACTURING METHODS

CROSS-REFERENCE TO RELATED APPLICATIONS

This application is a continuation-in-part of U.S. application Ser. No. 10/993,423 titled "Variable Optical Arrays and Variable Manufacturing Methods" filed on Nov. 18, 2004, which claims the benefit of U.S. Provisional Application No. 60/523,076 titled "Optical Arrays That Can Be Easily Manufactured Over a Large Range of Sizes And Densities" filed on Nov. 18, 2003. The disclosures of both of the above applications are incorporated herein by reference in their entirety.

This application is related to U.S. Provisional Application No. 60/523,006 titled "Reflective Multi-Image Surface" filed on Nov. 18, 2003, and further filed as a U.S. Non-Provisional Application filed on Nov. 18, 2004. This application is related to U.S. Provisional Application No. 60/536,861 titled "Spatially Multiplexed Image Projector" filed on Jan. 16, 2004. This application is related to a U.S. Provisional Application titled "Catadioptric Projection Screen" filed on May 25, 2004. This application is related to U.S. application Ser. No. 10/961,834 titled "Projection-Receiving Surface That Functions in Strong Ambient Light" filed on Oct. 7, 2004.

FEDERALLY SPONSORED RESEARCH

Not Applicable.

SEQUENCE LISTING OR PROGRAM

Not Applicable.

BACKGROUND OF THE INVENTION

1. Field of the Invention

The present invention relates to lens arrays, methods of making lens arrays, and the construction of various lens array systems.

2. Related Art

Optical arrays using curved axial elements have several applications. However, the past efforts have been directed to the use of such elements as privacy glass for shower doors (a series of cylindrically-shaped glass joined in an array). Heretofore, there has been no known effort to make such elements into any lens of optical quality elements. Even if there had been such an effort, there is a difficulty in producing a large number of lens elements in the arrays, an inability to produce arrays with very small lenses, and the troubles associated with changing the characteristics of the lenses after an array-making tool has been fabricated. These are all shortcomings that currently limit the utility and scope of using optical lens arrays. Making such a tool is extremely expensive, extremely difficult, and not amenable to modification once it is made.

SUMMARY OF THE INVENTION

This invention overcomes the aforementioned shortcomings by taking a completely different approach. Specifically, the invention divides the lens focusing process into two or more surfaces that incorporate multiple axial optic elements on each surface; where "axial optics" includes the use of cylindrical lenses as examples. In the case of cylindrical lenses, if the lenses are cut transverse to the axis of the cylinder, the cut will expose the same contour as cross cuts made elsewhere along the lens.

Although this invention is by no means limited to cylindrical lenses, they are convenient and easily understood examples of axial optics. Similarly, although this invention encompasses energies other than light (sound and radio waves, for example) the discussion herein will be limited to light because visual systems are readily familiar.

The axial optics may be manufactured by press-forming (using deformable solids), roll-forming (using deformable solids), molding (using a liquid), machining, or by suspended film (which could utilize deformable solids or liquids). If press-forming is used, then a deformable plastic is sandwiched by film and then pressed together by a tool. The tool forms the film and supporting plastic into the desired optic shape. The resultant optic may be cut according to the dimensions of the tool, or the tool may release the optic, which can be pulled forward incrementally for cutting. If roll-forming is used, the press-forming tool may be modified to a cylinder and the films and deformable plastic material may be rolled through in a continuous process. If suspended film is used, then there are several options. First, both sides of an optic may have a suspended film that is transparent. This leads to practical applications including a multi-image device, and a rear-projection screen, both of which are described in greater detail below. Second, one side of the optic may use a reflective film, leading to practical applications such as a front projection screen described in greater detail below and a multi-image device of the type described in a related U.S. patent application that is titled "Reflective Multi-Image Surface", filed on Nov. 18, 2004, now U.S. Pat. No. 7,123,411.

The powerful practical impact of the present invention is that a great number of optical elements may be created in a small area (approximately 90,000 discrete lenses per square foot), and the lens curvature may be varied without necessarily having to change the tooling for the lens elements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A is an elevated view of the first and second axial optic elements set perpendicularly with respect to each other, oriented with flat surfaces towards each other, and further illustrating a single focal point for light passing through both axial optic elements.

FIG. 3B is a top view of FIG. 3A, wherein the first and second axial optic elements set perpendicularly with respect to each other, oriented with curved surfaces towards each other, and further illustrating a single focal point for light passing through both axial optic elements.

FIG. 3C is a side view of FIG. 3A, wherein the first and second axial optic elements set perpendicularly with respect to each other, oriented with curved surfaces towards each other, and further illustrating a single focal point for light passing through both axial optic elements.

FIG. 4 is an elevated view of first and second axial optic elements disposed in a crossed relationship, oriented with the curved surfaces towards each other, wherein light is being collimated as it originates from a light source and passes through two crossed lenses.

FIG. 14 illustrates the general concept of the class of practical application of a spatially-multiplexed image deconvolver with the respective positions of a light source, a Composite Image, a Lens Array, and two different Viewable Images within two Viewer Angular Regions, as well as example rays coming from selected Lens Source Groups.

FIG. 27A is an elevated view of the press-forming process embodiment of the present invention.

FIG. 27B is a side view of the press-forming process embodiment of FIG. 27A.

FIG. 27C is a detail assembly view taken of area 27C of FIG. 27B.

DETAILED DESCRIPTION OF THE PREFERRED EMBODIMENTS

The following description of the preferred embodiment(s) is merely exemplary in nature and is in no way intended to limit the invention, its application, or uses.

Axial Optics

It is helpful to explain the concept of axial optics, and how axial optics may be obtained by the present invention before proceeding in further detail with other aspects of the invention. Axial optics may be obtained by machining, or by molding, as described below.

First, axial optics may be obtained by machining. Specifically, in a milling operation a piece of optic-compatible material can be mounted onto a milling bed and fed into a cutting tool (such as a ball mill or other cutting shapes) along a continuous axis to obtain a continuous cut that is linear when examined from at least one viewing perspective. The milling bed can then be offset to produce a cut that is also linear when observed with the same aforementioned perspective, and is nearly parallel to the first. These parallel cuts produce an axial optic. Continuing with additional parallel cuts can produce an array of axial optics.

Another mechanical way to obtain axial optics is the extrusion process. An axial optic can be made via extrusion, whereas a spherical optic cannot be made via extrusion. The extrusion mold can be machined longitudinally, and then polished. The significance of this invention's use of axial optics will be recognized for the aforementioned example of 90,000 spherical lenses per square foot surface as discussion continues below and it is shown that by use of overlays of axial optics the manufacturing problems are reduced many thousand-fold.

Broadly speaking, many techniques are suited to production of the axial optic surfaces. Included among these is fabrication of tooling to be used in replication of the appropriately surfaced pieces of material. Milling, broaching, casting, pressing, stamping, etching, vacuum forming, electroforming, and extruding are a few of the available techniques for making tooling. These tools can be used to fabricate the separate pieces via material addition to cavities (injection, casting, deposition, precipitation, photo-processes, extrusion, etc.), via material extraction (milling, broaching, etching, photo-processes, etc.), and via material displacement (rolling, flat pressing, stamping, melting to form, etc.).

I. Crossed Axial Optics and Methods of Manufacture

The present invention divides the two-axis focusing process exhibited by standard optics (camera lenses, projector lenses, microscope lenses, etc.) into two or more one-axis stages by using two or more axial optic elements with two or more of the axes set more or less crosswise to one another. Employing crossed axial optics in such a manner makes manufacture of lens arrays much more practical and economical than with standard two-axis lens array manufacture.

Figure 1A:
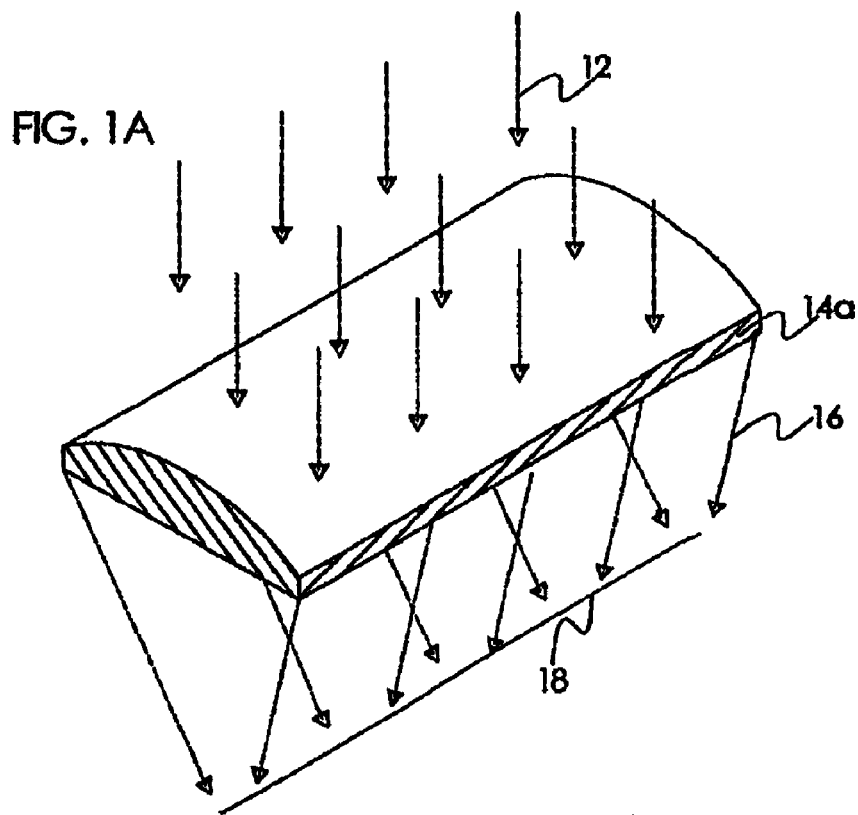
FIG. 1A is an elevated view of a first axial optic element having a curved surface that receives light, and a flat surface where the light exits, and the exiting light is focused into a line at a focal surface.
Figure 1B:
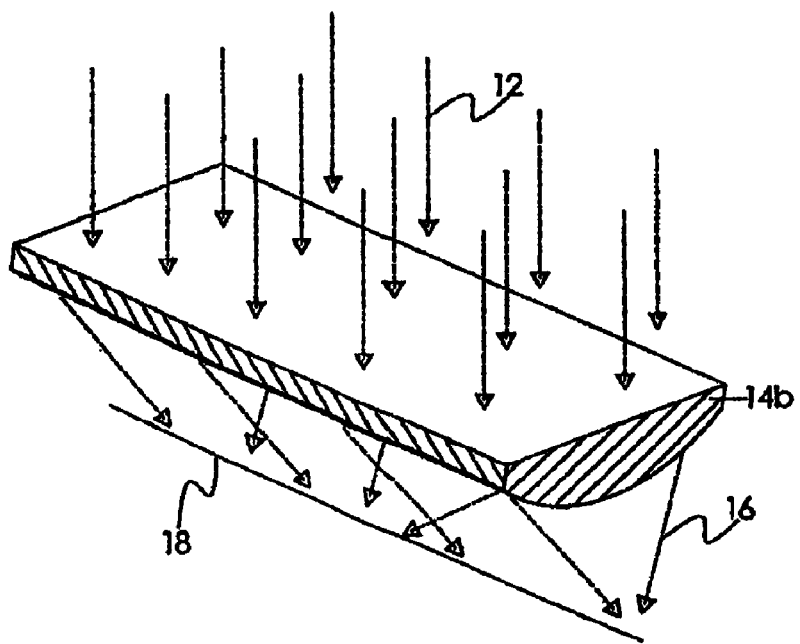
FIG. 1B is an elevated view of a second axial optic element having a flat surface that receives light, and a curved surface where the light exits, and the exiting light is focused into a line at a focal surface.

In FIGS. 1A and 1B, parallel rays of light are shown entering two lenses perpendicularly from above. (Impinging light rays being parallel to each other and/or striking the lens surface at a perpendicular are not requirements of this invention, but merely a convenient situation for explanation of the concepts involved.) The cylindrical lens focuses the light into a line. That is, the effect of focusing is in one direction that is aligned with the axis of the lens cylinder. The light rays converge to a concentration at a specific distance from the lens in accord with various properties, including, but not limited to, the curvature of the cylinder and the refractive index of the material from which the lens is made. After the light is concentrated to a line, if it is not interrupted by a physical blockage, the light (after already having come into focus) continues by diverging away from the point, the divergence angle being consistent with the angle of the original incoming ray. On one side of the concentrated line, the light converges on it from different directions. On the other side of the concentrated line, the light diverges as it continues to travel.

Figure 1C:
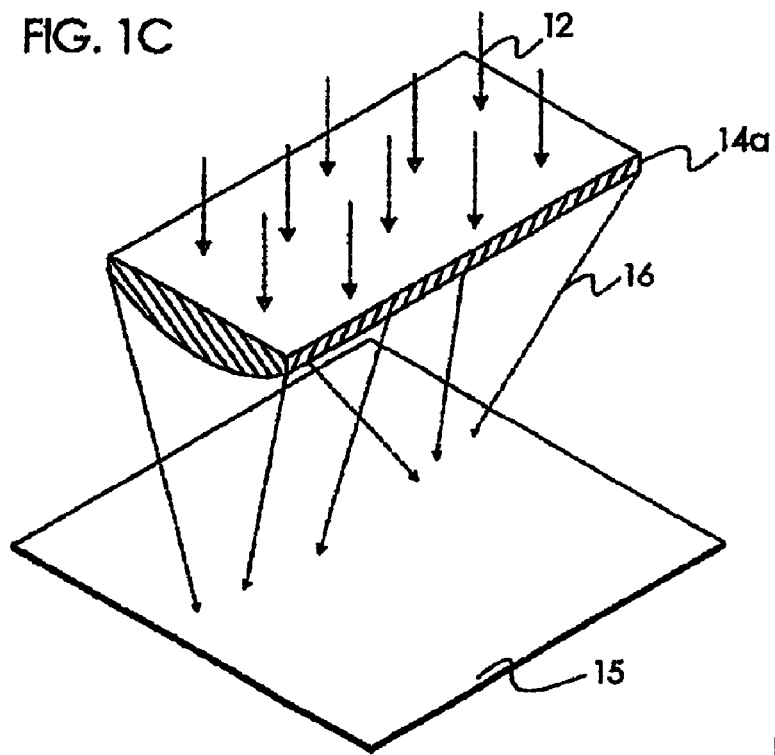
FIG. 1C is an elevated view showing a physical blockage of light.
Figure 1D:
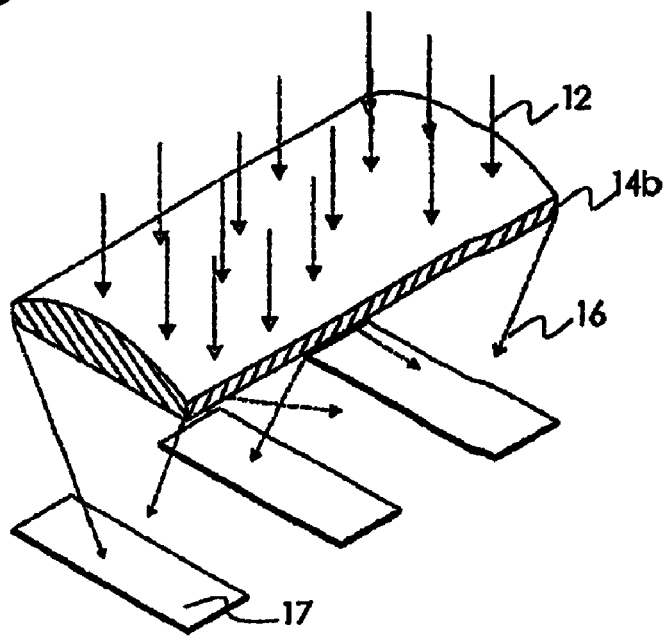
FIG. 1D is an elevated view showing a partial physical blockage of light.

However, this invention includes cases wherein a physical blockage 15 and 17, in whole or in part, is used. Partial physical blockage 15 and 17 is also included in this invention. Physical blockage 15 and 17 is shown in FIGS. 1C and 1D. Non-limiting examples of uses of partial physical blockage 15 and 17 include the control of lens-effective apertures, the interaction of incoming light with pixels of existing images via intermediate focal planes that contain the images in a transmissive and/or reflective form, and encoding of information via spatial filtering. Examples of physical blockage material include, but are not limited to, photographic film, CCD video chips, and any other photosensitive material. Also, partial blockage 15 and 17 may be desired. An example case of partial blockage material 15 and 17 is an array of color filters. These filters would be installed in the array focal plane to make a composite picture which is the summation of a pattern of the incoming light and a pattern at the focal point of the array. This invention is not limited by this example, as there are many other possibilities, including the use of neutral color blockers instead of colored blockers. Additional examples of selective (partial) blockage of the array is usage as an encoder/decoder of image-based information, slide transparency film, and photographic film—so it can be seen that partial blockage and full blockage 15 and 17 may refer to either the light blocking or the physical position of an element, and thus may be the result of either a somewhat transparent interpositioning of an element, or a fully light-blocking element in certain areas for spatial filtering, or a combination.

Figure 2A:
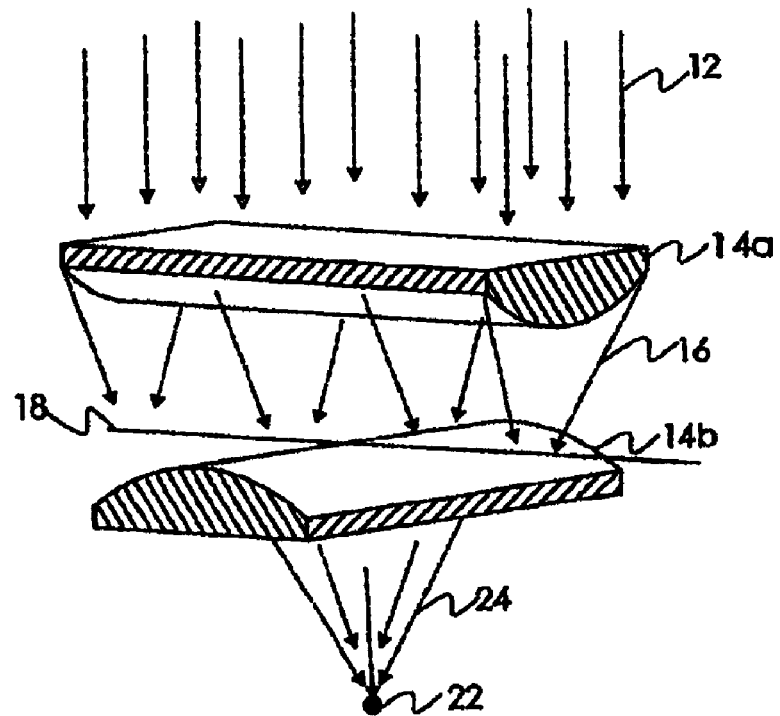
FIG. 2A is an elevated view of the first and second axial optic elements set perpendicularly with respect to each other, oriented with curved surfaces towards each other, and further illustrating a single focal point for light passing through both axial optic elements.
Figure 2B:
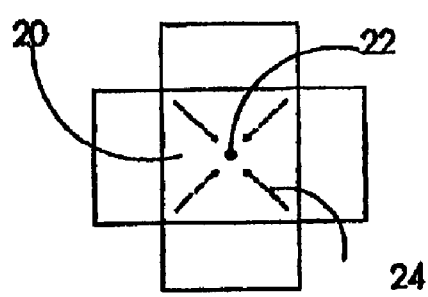
FIG. 2B is a top view of FIG. 2A, wherein the first and second axial optic elements set perpendicularly with respect to each other, oriented with curved surfaces towards each other, and further illustrating a single focal point for light passing through both axial optic elements.
Figure 2C:
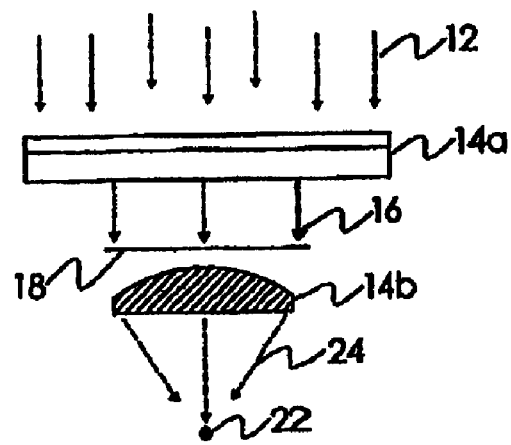
FIG. 2C is a side view of FIG. 2A where the first and second axial optic elements are set perpendicularly with respect to each other, oriented with curved surfaces towards each other, and further illustrating a single focal point for light passing through both axial optic elements.

If the first cylindrical lens 14a and second cylindrical lens 14b in FIGS. 1A and 1B are aligned orthogonally with respect to each other, are stacked vertically, and aligned transversely to the path of incoming light, shown generally at 12, (and as shown in FIGS. 2A, 2B, 2C, 3A, 3B, 3C and 4), then first lens 14a focuses incoming light 12 to exit light lines 16 which forms line 18. The combined effect of both lenses 14a, 14b will be to focus the light to a spot 22. This spot 22 approximately represents the crossing point of the two exit light lines 16 associated with each of the two lenses when considered independently. The incoming light 12 focused to spot 22 will be that which impinges an area approximately defined by the overlap area of the two cylindrical lenses. Accordingly, the crossed cylindrical lenses can operate together as a collector of light, as depicted in FIGS. 2A, 2B, 2C and 3A, 3B, and 3C. FIGS. 2A, 2B and 2C show the two lenses with their curvatures toward each other, and FIGS. 3A, 3B, and 3C show the combination with the flats toward each other.

Here it should be noted that the example lenses need not have curvature on one side and be flat on the other. In fact, putting the crossed cylindrical arrays on opposite sides of the same piece of material is nearly equivalent to the arrangement shown in FIG. 3A, 3B, and 3C. It should be further noted that the lenses need not be convex, although that is the common shape in the figures used for discussion of this invention. Further, the invention may have any number of axial-optics surfaces stacked in succession, so long as that number is at least two.

FIG. 4 illustrates that the crossed lens array can be used to collimate light as readily as it can be used to collect light. In FIG. 4, light 28 emanating from a light source 26, placed at the composite focal point of the two lenses 14a and 14b, is allowed to radiate towards lens 14a. Light 16 then exits first lens 14b and diverges and collimates. Collimated light 30 exits from second lens 14a. The light that falls under the influence of the area where the two lenses overlap will be collimated 30 more than it was when light 28 was first radiating outward from the source 26.

Figure 5:
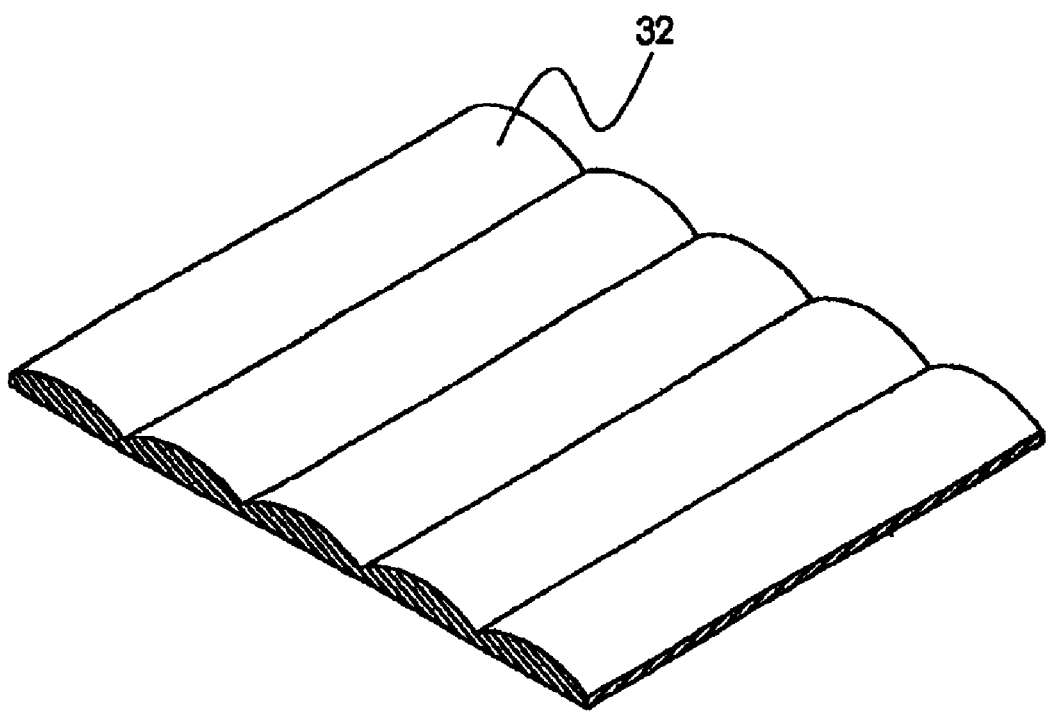
FIG. 5 is an elevated view of an array of axial lens elements.

FIG. 5 shows that the surface on a piece of material can be provided with more than one axial optic. In this figure, an axial lens array 32 comprising five cylindrical lenses is shown in abutment to one another. (It is not a requirement of this invention that all the axial optics on a surface be the same in cross section as seen in FIG. 9A-9E.)

Figure 6A:
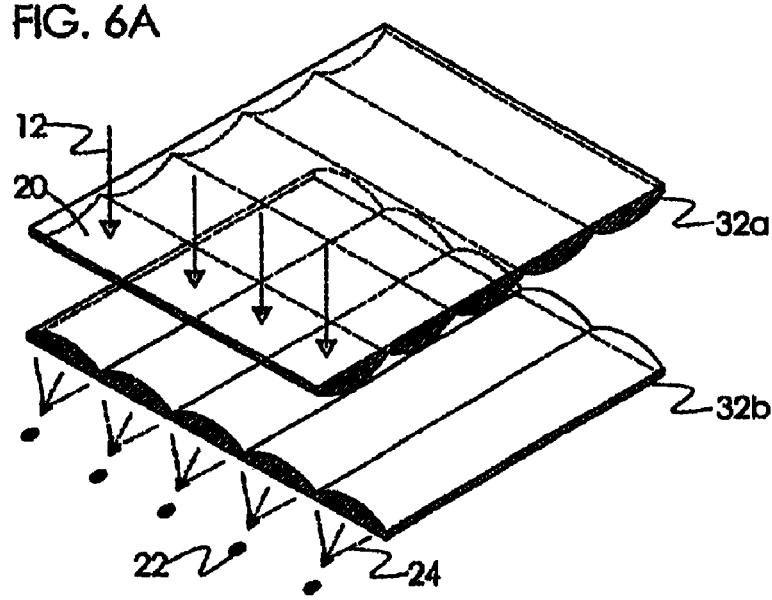
FIG. 6A is an elevated view of a first array of axial lens elements, and a second array of axial optic elements set perpendicularly with respect to each other, oriented with curved surfaces towards each other, and further illustrating a series of single focal points for light passing through both axial optic elements.
Figure 6B:
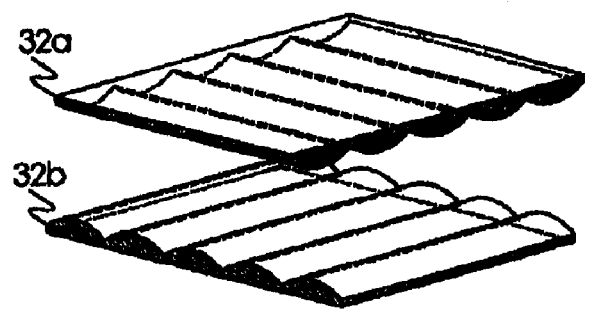
FIG. 6B is another elevated view of the arrays of axial lens elements of FIG. 6B.
Figure 6C:
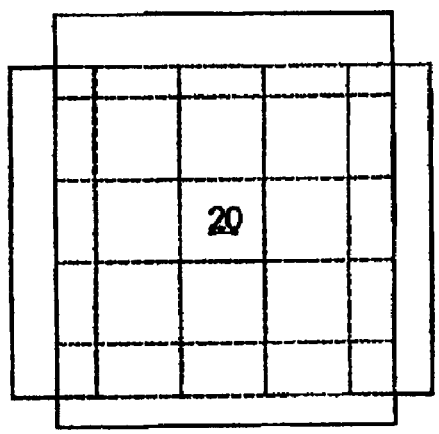
FIG. 6C is a top view of FIG. 6A, wherein the first and second array of axial lens elements are disposed perpendicularly with respect to each other, oriented with curved surfaces towards each other.

As with the individual cylindrical lenses discussed earlier, a piece of material with multiple cylindrical lenses 32a can be crossed with another piece having multiple cylindrical lenses 32b, thereby producing a two-dimensional lens array such as illustrated in FIGS. 6A, 6B, and 6C. In this figure, the particular overlay area 20 associated with each cylindrical lens element is a collector of light that produces its own focal spot 24 using the light that falls upon that area 20. There are 25 such individual areas in FIGS. 6A, 6B, and 6C, resulting from the surfaces of five cylindrical lenses in one array 32a being stacked transversely above the surfaces of five cylindrical lenses in a second array 32b surface.

This invention includes configurations where each axial optic on a piece of material is not necessarily the same as other axial optics on the same piece. In FIG. 6C the 25 overlap areas are shown bounded by dashed lines. However, every overlap area in FIGS. 6A, 6B, and 6C does not show impingement with light. This demonstrates that there are instances when it is desirable that the array not have light fall upon every element overlap area 20.

Figure 7A:
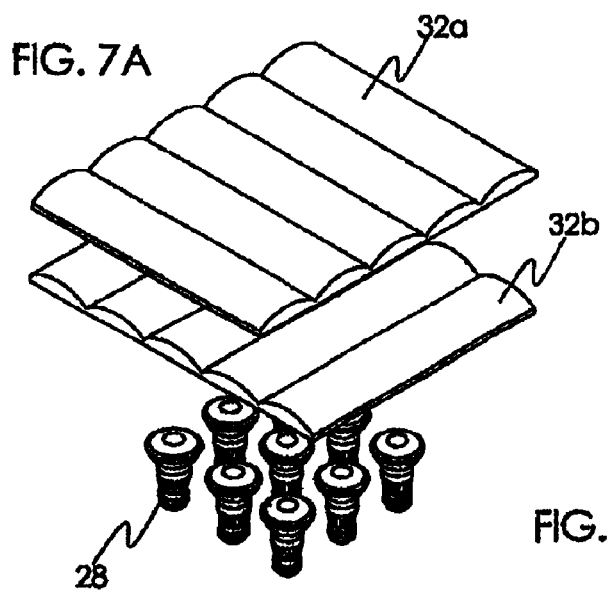
FIG. 7A is an elevated view of a first array of axial lens elements having a flat surface closest to the rounded surface of a second array of axial lens elements, wherein the first array is oriented above and perpendicularly with respect to the second array, and further illustrating an elevated view of the resulting projection.
Figure 7B:
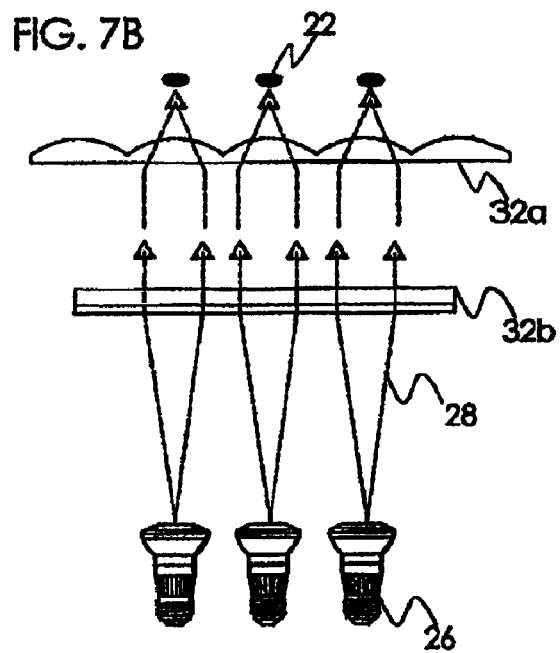
FIG. 7B is a side view of the embodiment shown in FIG. 7A.
Figure 7C:
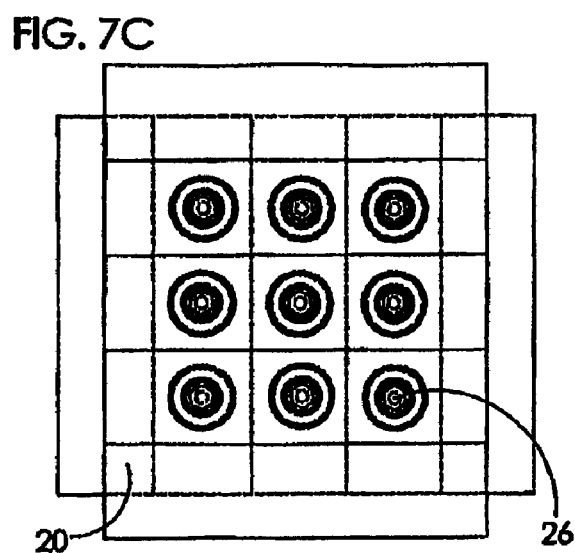
FIG. 7C is a top view of the embodiment shown in FIG. 7A.
Figure 8A:
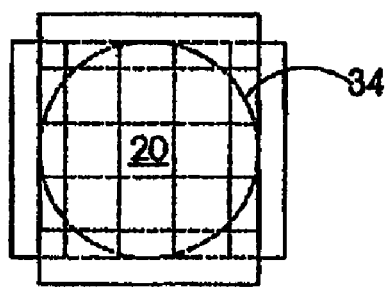
FIG. 8A is a top view of the overlapping area of first and second axial lens element arrays oriented perpendicularly, with curved surfaces facing each other, and a hidden view of the resulting projection.
Figure 8B:
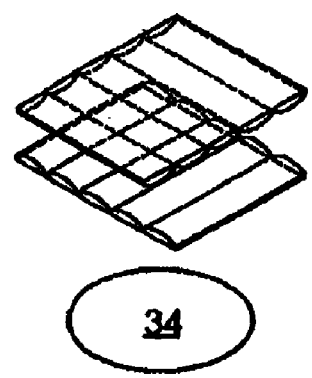
FIG. 8B is an elevated view of first and second axial lens element arrays oriented perpendicularly as shown in FIG. 8A, with curved surfaces facing each other, and an elevated view of the resulting projection.
Figure 8C:
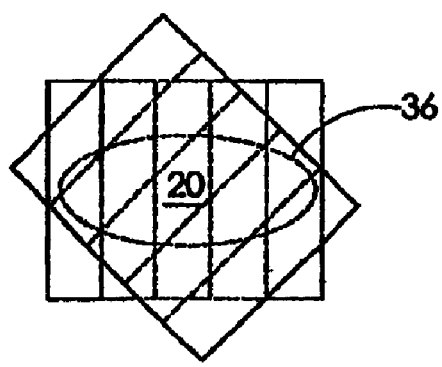
FIG. 8C is a top view of first and second axial lens element arrays oriented at a 45 degree orientation, with curved surfaces facing each other, and a hidden view of the resulting projection.
Figure 8D:
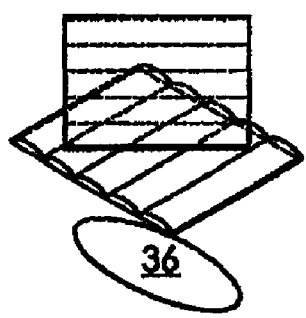
FIG. 8D is an elevated view of first and second axial lens element arrays oriented at a 45 degree orientation as shown in FIG. 8C, with curved surfaces facing each other, and an elevated view of the resulting projection.
Figure 8E:
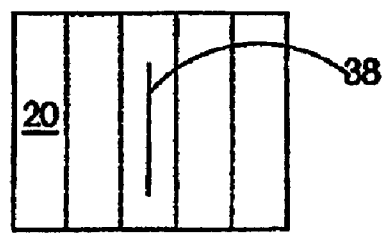
FIG. 8E is a top view of first and second axial lens element arrays oriented in registry, with curved surfaces facing each other, and a hidden view of the resulting projection.
Figure 8F:
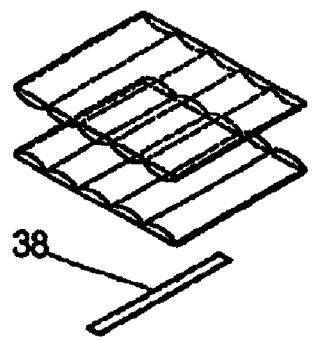
FIG. 8F is an elevated view of first and second axial lens element arrays oriented in registry as shown in FIG. 8E, with curved surfaces facing each other, and an elevated view of the resulting projection.
Figure 9A:
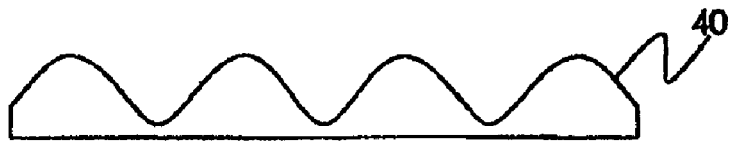
FIG. 9A is a side view of a first curved surface for an axial optical element array.
Figure 9B:
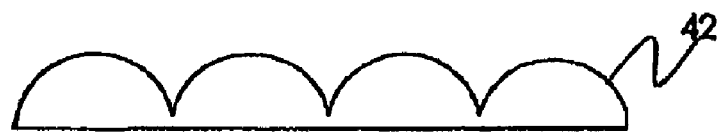
FIG. 9B is a side view of a second curved surface for an axial optical element array.
Figure 9C:
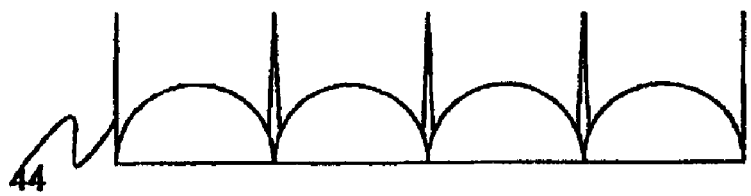
FIG. 9C is a side view of a third curved surface with baffles for an axial optical element array.
Figure 9D:
FIG. 9D is a side view of a series of flat, apex-forming surfaces for an axial optical element array.
Figure 9E:
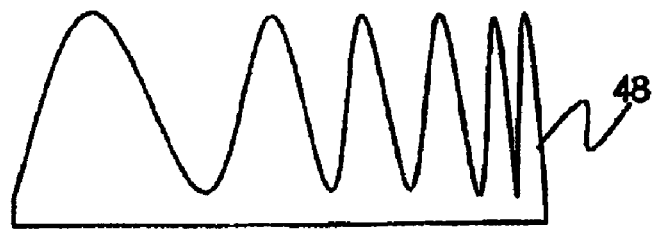
FIG. 9E is a side view of a series of non-uniform curved surfaces for an axial optical element array.

FIGS. 7A, 7B, and 7C illustrate a two-dimensional lens array 32a, 32b where the application is a collimator of light emanating from many sources 26, each located at the focal spot 22 of the lenses 32a, 32b created by the overlap 20 of the axial optics 32a, 32b. In effect, this condition is the inverse use of the arrays 32a, 32b to their use in FIGS. 6A, 6B and 6C. The axes of two sets of axial-optics 32a, 32b need not be arranged perpendicularly with respect to one another. For example, continuing with the cylindrical optics illustration, FIGS. 8E and 8F show that when the axes are aligned with each other, the result is focus into a series of parallel lines, rather than focus into an array of spots. When the sets are oriented non-parallel, in other words, the longitudinal axis of the first optic is skew relative to the longitudinal axis of the second optic, as in FIGS. 8A-8D, focus into spots begins to take place. However, the spots are not symmetric, as they are with the sets oriented transverse to each other. Thus, in FIGS. 8A, 8B, 8C, 8D, 8E, and 8F, as the pieces are rotated relative to each other, the resultant convergence of the impinging light moves from circle-like, to ellipse-like, to linear.

As mentioned earlier, the axial optics need not have a uniform common shape, nor do they need to have the same "footprint" size, or the same purpose, or sameness of other common features beyond that they can be produced with a continuous linear, circular, or other axial-type process that might be employed.

However, it is a common feature in this invention that the desired optical effects support the creation of an array of independent optical elements. This is true whether the reference is to either axial optics of the set on the face of the same piece of material, or to the individual axial optics on another face. This is an important distinction of this invention relative to other optical systems, such as a Fresnel lens, the purpose of which is to collectively create a singular displacement or focal point for incoming parallel light. A Fresnel optical system, for example, is intended to create only one image of a scene when using one system. Unlike the Fresnel, this invention will support production of a large number of images of a scene when using one system.

When an array of 1000 axial optics is crossed with an array of 1000 axial optics, 1 million lenses are created.

Some example cross sections for the axial optics applicable to this invention are shown in FIGS. 9A, 9B, 9C, 9D, and 9E. These represent some key shaping concepts, though the figure by no means is an exhaustive representation of all the possible embodiments of this invention.

Also encompassed by this invention are configurations wherein the axial optics are imbedded within the pieces of materials, such as with linear cavities in plastic, glass or other suitably transparent materials. Additionally, where appropriate, liquids and gases of various refractive and transparency qualities can be flowed within the system to alter the focusing, color, and other characteristics of a lens array.

The current preferred embodiment, which has been built and tested by the inventor, is a design wherein two pieces of axial optics are made by casting resin with axial lenses spaced 1/16" apart and having a focal length of 1/8". The two pieces, both of which use axial optics that are cylindrically shaped, are then crossed, as per FIGS. 2A, 2B, and 2C or FIGS. 3A, 3B, and 3C, to produce an array as depicted in FIGS. 6A, 6B, and 6C and FIGS. 7A, 7B, and 7C. Although this particular embodiment is currently preferred, the invention is not limited to the shapes, sizes, or manufacturing techniques used in this example.

An extremely valuable feature of the invention is that it allows cost effective manufacture of two-dimensional lens arrays, and facilitates manufacture of lens arrays of a spatial density that would be impractical, if not impossible, using prior optical manufacturing methods. Also, in several embodiments of this invention, the optical characteristics can be readily changed even after fabrication.

Applications of the resultant arrays include, but are not limited to, the following optical examples: Optical computing, communication, and coding; rear-screen and front-screen projection for theaters, home entertainment and schools; advertisement signage and scoreboards; "eyeglasses" for military heads-up displays and for virtual reality systems to display a different three-dimensional image for each eye by collimating selected pixels; along with others. As previously indicated this invention is not limited to optical applications. This invention is also applicable to other regions of the electromagnetic spectrum, as well as to acoustic and other mechanical energies.

IA. Curved Axial Optics Using Suspended Film

Up to this point, optical arrays employing machined or molded optics have been discussed. From this point forward, an entirely different way of producing an optic is discussed—suspended film. Then, additional practical applications employing this new suspended film optic are discussed.

Figure 10:
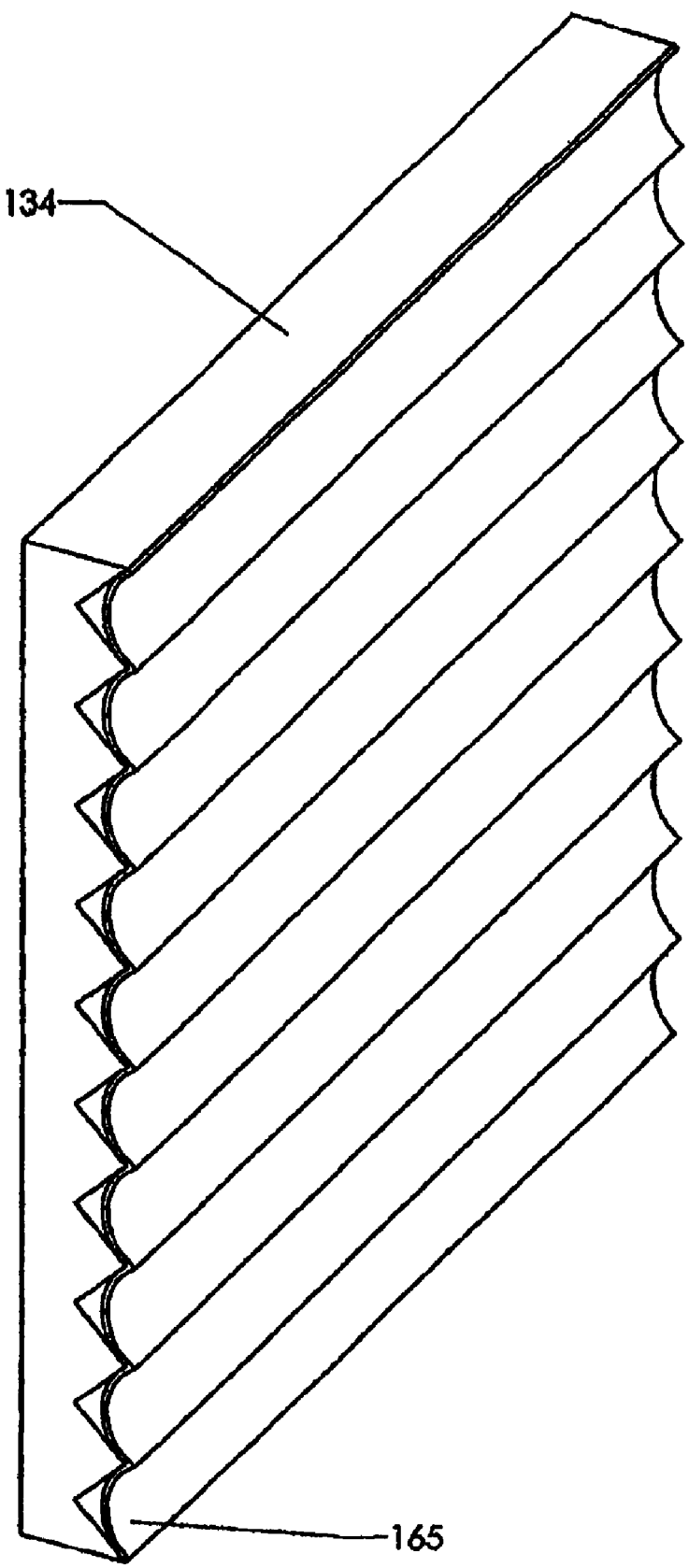
FIG. 10 illustrates an elevated view of a film suspended on a tool.

In FIG. 10, a tool 134 is created by making a series of longitudinal cuts to create thin walls 102 spaced at a distance D of preferably 1 mm. Tool 134 is shown with v-shaped longitudinal cuts, but can also have square cuts. Holes (not shown) or even grooves, may be placed along the bottom of the cuts to provide communication for a differential pressure V. A sheet of film 104, transparent or reflective, is placed over the walls 102. Then, differential pressure V is applied via the holes (not shown) between the walls 102 to pull the film 104, and a curved axial optic 110 is formed. It is very important to understand that there is no further polishing of the optic that is required in order to have an optical quality surface. Then, in a first embodiment, a polymer 112 may be poured behind the curved axial optic 110, and a permanent axial optic is created, having a light focusing ability as shown in FIG. 2A. A preferred polymer material may be obtained from Applied Poleramics, Incorporated, of Benicia, Calif. Preferred specific materials from Applied Poleramics are 266 epoxy and AU16 polyurethane, as well as EFM 15 and EFM 18 phenolics. In addition, the outside of the optic may be coated for protection of the optic surface, such as, for example, a thin acrylic coating, a urethane coating, or a polyethylene coating to prevent oxidation, abrasion or other surface degradation. Such coatings may be purchased from Peabody Laboratories, Inc. located at 1901 S. 54$^{th}$ Street, Philadelphia, Pa. 19143, and sold under the trade name PERMALAC. The differential pressure may be varied to vary the curvature of the axial optic.

In a second embodiment, a transparent tool 100 may be used with film 104. Here, the curved axial optic is continuously variable in curvature depending upon varying level of differential pressure. When a projected image is focused through the curved axial optic, the curvature of the optic may be changed by changing the level of differential pressure V, thereby yielding a variation in the focus of the image. This has very useful applications when the changing focus is coordinated with either a changing image or a changing viewer location.

In any preferred embodiment, any film 104 may be used such as acetate, polyethylene, polypropylene, polycarbonate, or acrylic where the thickness is preferably between 0.25 mils and 1 mil.

Figure 11:
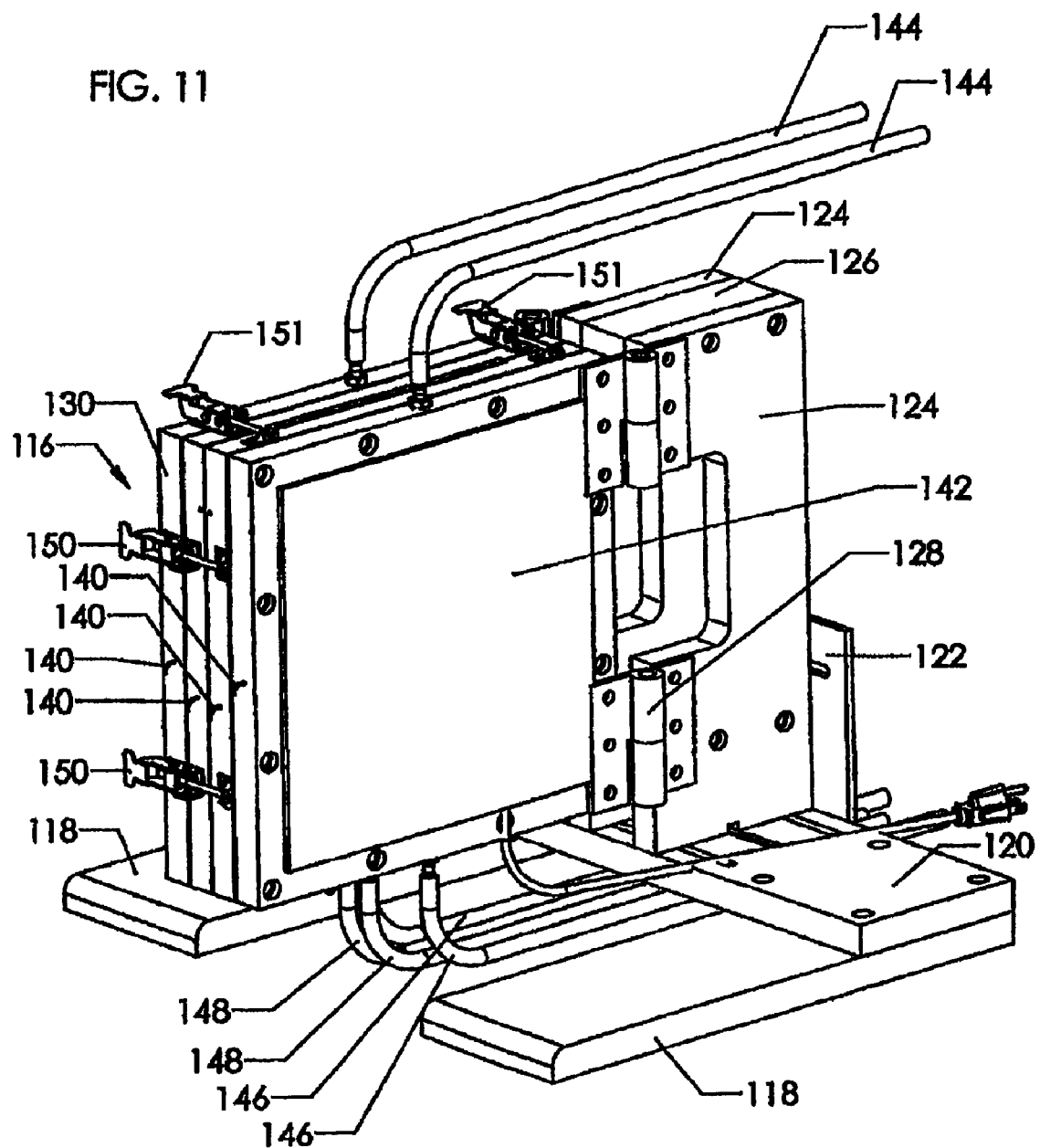
FIG. 11 illustrates an elevated view of a mold with external attachments.
Figure 12:
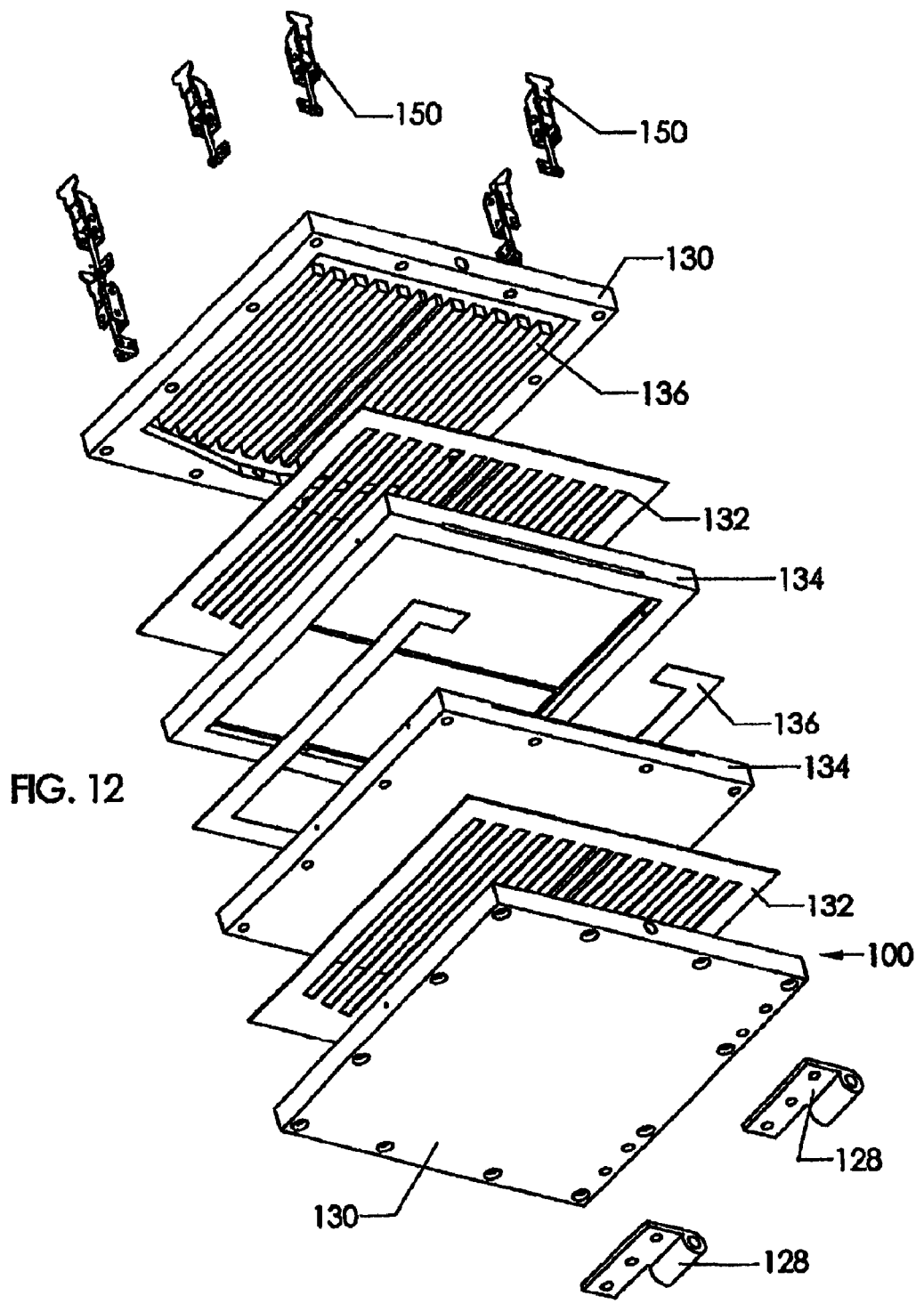
FIG. 12 illustrates an elevated assembly view of the mold of FIG. 11.
Figure 29A:
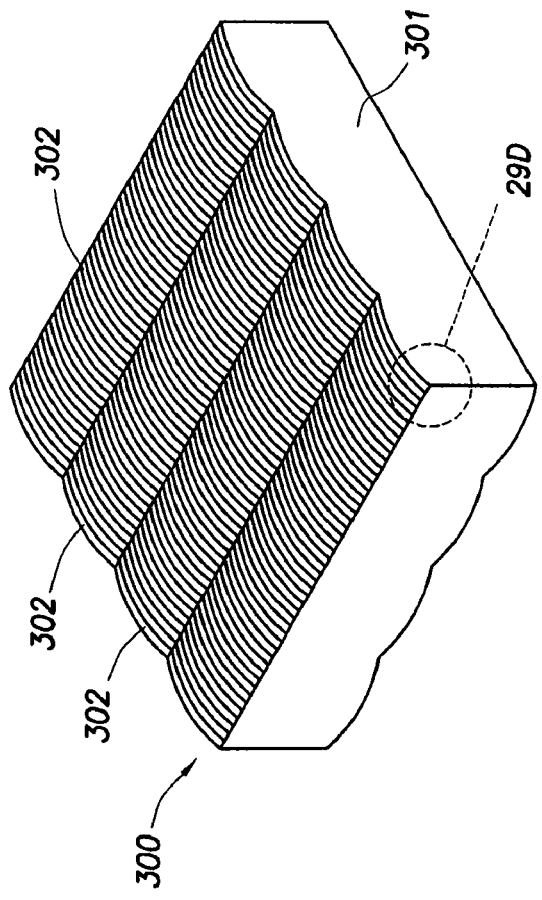
FIG. 29A is an elevated view of a crossed-array screen having striations.
Figure 29B:
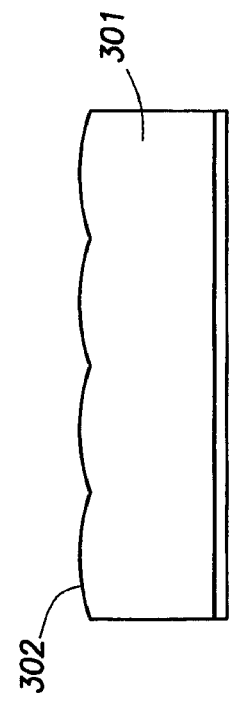
FIG. 29B is a front view of the crossed-array screen of FIG. 29A.
Figure 29D:
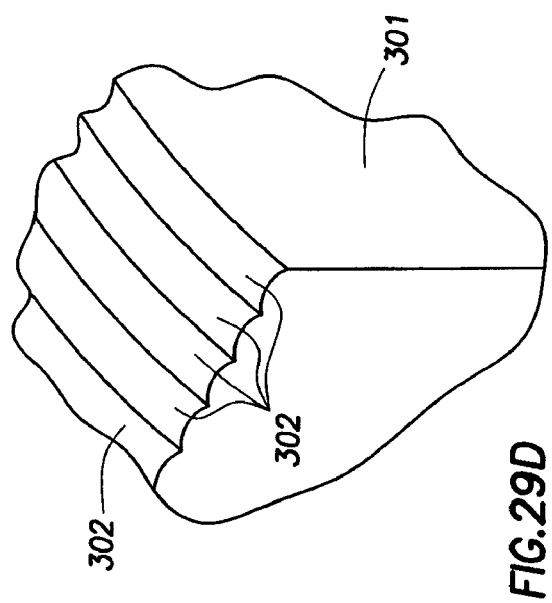
FIG. 29D is a detail view of circle 29D of FIG. 29A.

When two tools 100 are employed simultaneously, facing each other in a crossed relationship, then it is easily seen that a crossed optical array is created. Then, the space between the films 104 may be filled with a plastic (the term "plastic" is intended to be used generically in its broadest sense and not meant to be limited to "polymer"). One preferred plastic is the epoxy referred to above, which because of its low viscosity, pours like water between the films where it is then heated and cured. This approach is used in reference to FIGS. 11 and 12. In FIGS. 11 and 12, a mold is shown generally at 116. Mold 116 has as supporting structure leg supports 118, base support 120, stabilization plate 122, upright supports 124, and spacing block 126. Hinges 128 permit easy access to the inner cavity by permitting laterally swinging and removable hinged doors 130. These doors 130 allow production personnel access to all necessary components concerning pre and post curing operations which may include secondary trimming. As better seen in FIG. 12, mold 116 has doors 130, radiator 131, radiator gasket 132, vacuum bed 134, and spacing gasket 136. Tool 100 is placed within vacuum bed 134, on each side. As better seen in FIG. 11, a temperature sensor array 140 is provided on the exterior of the mold 116, as are external heating sources 142 (fixed onto doors 130 using a high temperature adhesive backing), high temperature fluid inlet hoses 144, high temperature fluid outlet hoses 146, and vacuum hoses 148. In use, film 104 is placed on each of two tools 100 on each side of vacuum bed 134. Doors 130 are swung shut, and the assembly is latched 150. Differential pressure is asserted through vacuum hoses 140 to pull and suspend film 104 into a curved axial optic shape. Both films are pulled away from each other. It should be noted that pressure may be asserted instead of vacuum through vacuum hoses 140. Then, after the plastic, preferably epoxy, is poured and cured, a final curved axial optic solid is the result, curved at the outside and sharing a common center. Material sheets (pieces) can be flexible or rigid to varying degrees as appropriate to an application. The sheets can be combined with the use of gravity, adhesives, solvents, vacuum, fusion, pressure, mechanical devices, and other options. Edges of the stacked combinations can be left open or sealed. (Sealing allows for cleanliness and fluid containment; with the fluids being either gas or liquid or a combination of both.) The resultant array assemblies can be comprised of two or more axially-produced optical layers, with each layer being the same or different in figure, finish, material, or other characteristic suited to the application. Such a resultant product is shown in FIG. 29A, which illustrates a top axial optical layer, and a bottom axial optical layer, with the longitudinal axis of the top axial optics being skew relative to the longitudinal axis of the bottom axial optics. It is possible to remove film 104 after the liquid filler (epoxy) cures. Removing film 104 removes a refractive index change at the interface between the film and the filler.

I.B. Axial Optics Using Press-Forming

In previous discussion the screen formation process has been described in terms of using fluids to produce outward pressure against the film such that the film forms catenary curvature as it is held across linearly tooled ridges. In addition to production of the pressure by fluids, either gas or liquid, the invention allows for fabrication of a hybrid reflection screen structure 280 by creation of outward pressure between two films 104, 282, using a more solidified inner material 284 at the production onset. The term "hybrid screen" is used in reference to a situation where a first array of optics are joined to a second array of optics, and this application expressly teaches three ways to achieve this: vacuum/molding (FIGS. 11-12), press-forming (FIGS. 27A-27C), and roll-forming (FIGS. 28A-28C).

As seen in FIGS. 27A, 27B, and 27C, a sheet of optically appropriate deformable material 284 is placed between the two films 104, 282, typically with one being reflective and the other being transmissive; although both films 104, 282 could be transmissive if one desires the formation of a matrix of lenses. Films 104, 282 may be made from polyethelene (PET). Deformable material 284 may be made from urethane. The arrangement, with the deformable material 284 positioned between the two films 104, 282 is placed between a first tool 290 and a second tool 292. First tool 290 has linear ridging 298. Then, the following are stacked sequentially: press (represented by "FORCE" on top of first tool 290, first tool 290, film 104, deformable filler material 284, film 282, second tool 292, and press (represented by "FORCE" on the bottom of second tool 292). The tools 290, 292 are subjected to pressure from each outside face of the stack, which forces the film 104 against the tooled ridges 298 to deform the film 104 between the ridges 298 into the form of catenary-like cross-sectioned cylinders 280. Preferably, the pressure will be applied to the tools 290, 292 using a heated press. When a heated press is used, deformable material 284 may be more easily deformed if the deformable material 284 is selected to be thermally deformable. When the product is allowed to cool, the result is a fixed-shape hybrid screen 280. As stated above, the term "hybrid" is used in this document to refer to any screen that is provided with a first axial optical array in electromagnetic communication with a second axial optical array, and these arrays may be integrally joined as shown in FIGS. 11-12, 27A-27C, and 28A-28C. The use of a heated press can also be used to activate and cure chemical processes in thermal-setting materials 284, which is a variant of the aforementioned simple elevated temperature thermal deformation process.

I.C. Axial Optics Using Roll-Forming

Figure 28C:
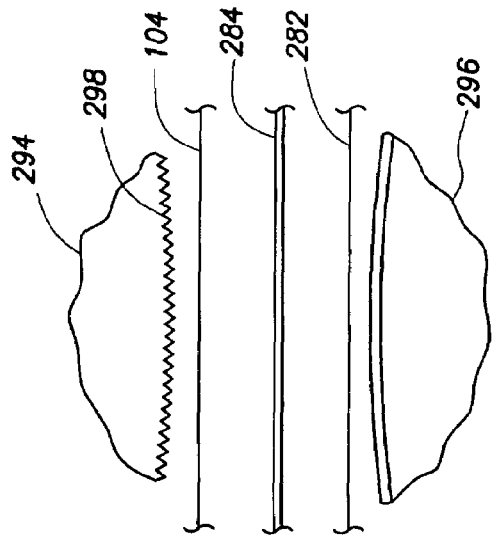
FIG. 28C is a detail assembly view taken of area 28C of FIG. 27B.
Figure 28B:
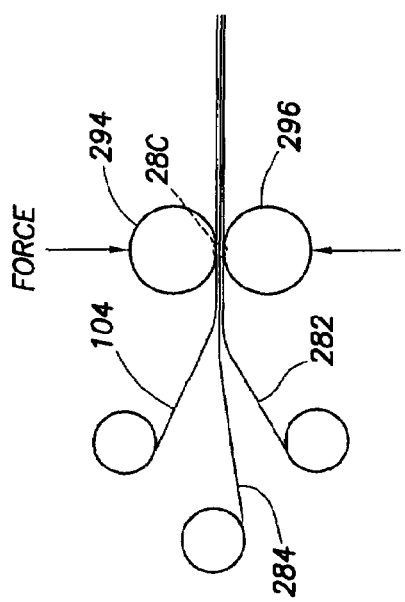
FIG. 28B is a side view of the roll-forming process embodiment of FIG. 27A.
Figure 28A:
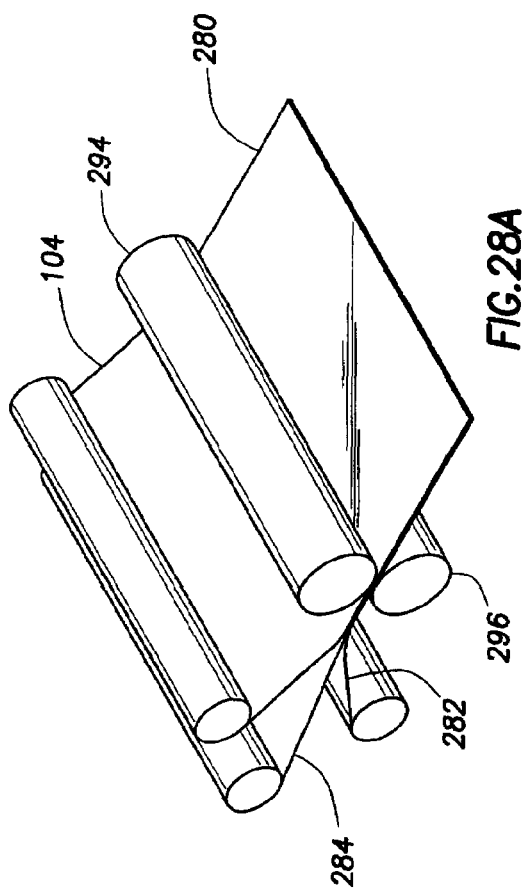
FIG. 28A is an elevated view of the roll-forming process embodiment of the present invention.

As seen in FIGS. 28A, 28B, and 28C, a sheet of optically appropriate deformable material 284 is placed between the two films 104, 282, typically with one being reflective and the other being transmissive; although both films 104, 282 could be transmissive if one desires the formation of a matrix of lenses. The arrangement, with the deformable material 284 positioned between the two films 104, 282 is placed between a first roller tool 294 and a second roller tool 296. First roller tool 294 has linear ridging 298. Then, the following are stacked sequentially and fed through roller tools 294, 296: film 104, deformable filler material 284, and film 282. The roller tools 294, 296 apply pressure which forces the film 104 against the tooled ridges 298 to deform the film 104 between the ridges 298 into the form of catenary-like cross-sectioned cylinders 280. Preferably, the roller tools 294, 296 are heated. When heated rollers 294, 296 are used, deformable material 284 may be more easily deformed if the deformable material 284 is selected to be thermally deformable. When the product is allowed to cool, the result is a fixed-shape hybrid screen 280. The use of heated rollers 294, 296 can also be used to activate and cure chemical processes in thermal-setting materials 284, which is a variant of the aforementioned simple elevated temperature thermal deformation process. The advantage of roll-forming is that a continuous process for forming an axial optical array allows for extremely long lengths of hybrid screen 280.

II.A. Traditional Lens-Type Applications

The resultant array assemblies can be used by themselves, or in conjunction with mechanical, electronic, or other optical systems. In particular, in the case where both films 104 are transparent, the resultant lens array may be used with variable axial optic widths in a crossed array arrangement to correct for astigmatism, provide nano-scale light effect, make adjustments on the order of magnitude of fractions of millimeters per lens, and can collimate on a pixel-by-pixel level.

II.B. Rear Projection Screen Applications

Figure 13:
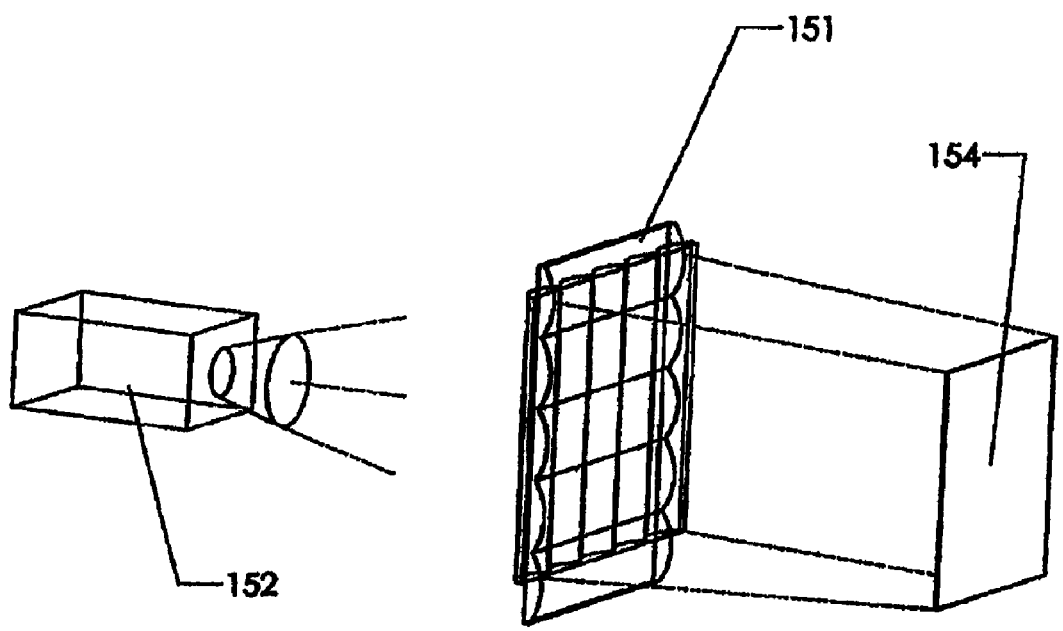
FIG. 13 illustrates a rear projection screen system using the crossed optical array of the present invention.

In addition, a very high quality rear projection screen may be manufactured. As seen in FIG. 13, a resultant array assembly can be used to form a rear projection screen 151. Specifically, a rear projection source 152 projects light through rear projection screen 151 which is a crossed optical array, resulting in a viewable image 154.

II.C. Spatially Multiplexed Image Deconvolver Applications

As a third class of practical application of the resultant array assembly using transparent films, a spatially multiplexed image deconvolver (a decoder) may be created. In this class of practical application, a method for the deconvolving of a multiplexed image with a lens array, such that viewers within different angle regions will see different individual source images. This represents a major improvement over prismatic techniques that have been used to present more than one picture from the same surface. The number of images can be on the order of magnitude of the hundreds rather than the two or three available with prisms. Also, the images can be selected by angular movements along more than one axis, compared to the one axis restriction of prismatic displays. The ability to achieve 3-dimensional images without specialized eyeglasses also will be greatly enhanced by the invention. Applications include, but are not necessarily limited to, artistic works, advertising, home decoration, packaging, entertainment backdrops, and amusement parks. While the present invention applies to lenticular images and not to hologram images, the present invention has advantages over both prior art systems.

A definition of terms is provided below to aid in understanding this invention.

A Source Image is an individual image whose elements are convolved (intermingled) with elements from other Source Images to form a Composite Image. The viewer sees a specific deconvolved Source Image within a certain range of angles during operation of this invention, the specific image being in accord with the invention's selectable parameters. The invention is most striking when it incorporates several Source Images, each viewable at different angles, but is capable of functioning with just one Source Image.

Figure 15A:
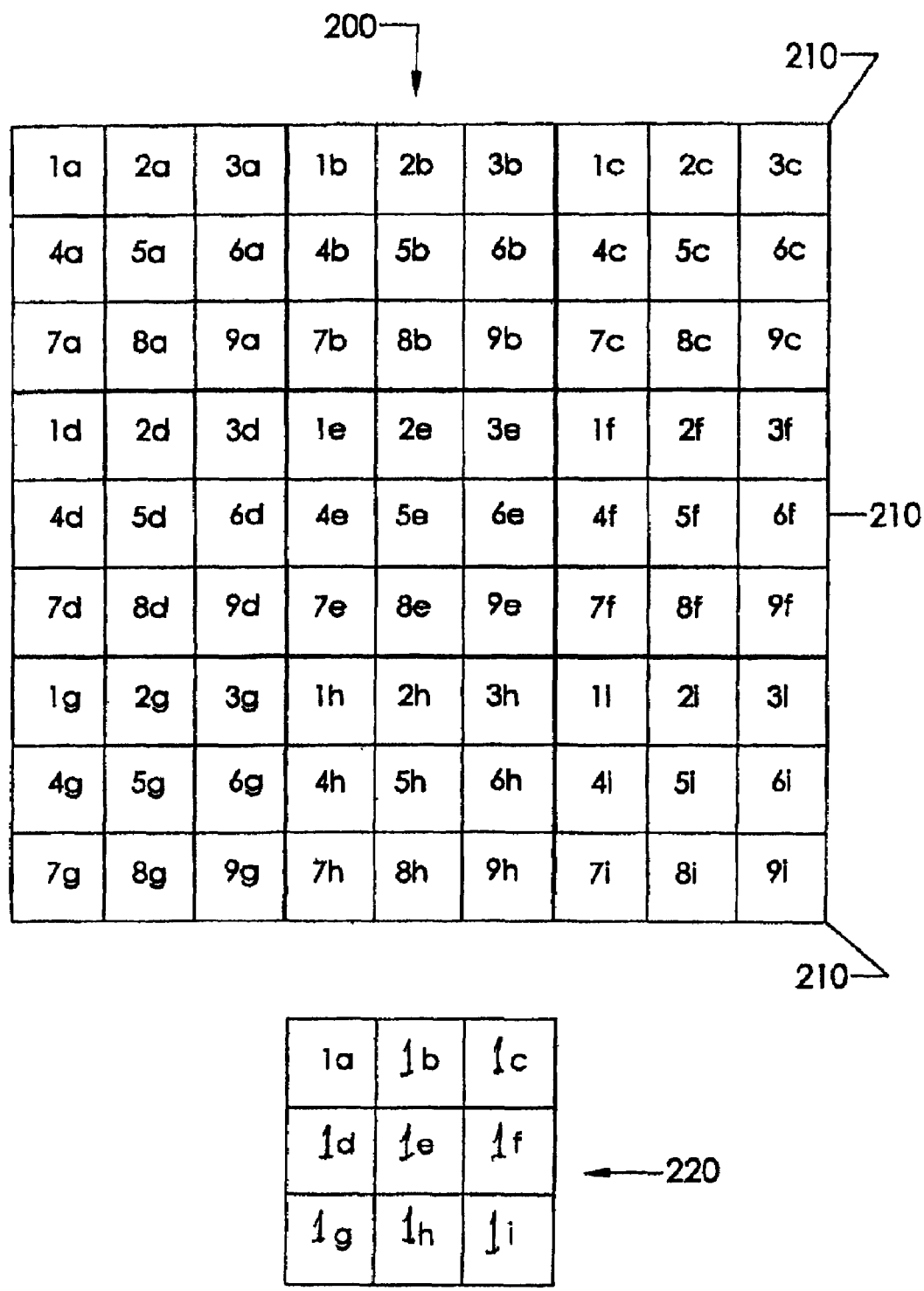
FIG. 15 illustrates a 9-by-9 array of pixels, totaling to 81 pixels, which make up the Composite Image, and one Source Image, which is made up of nine pixels.
Figure 15B:
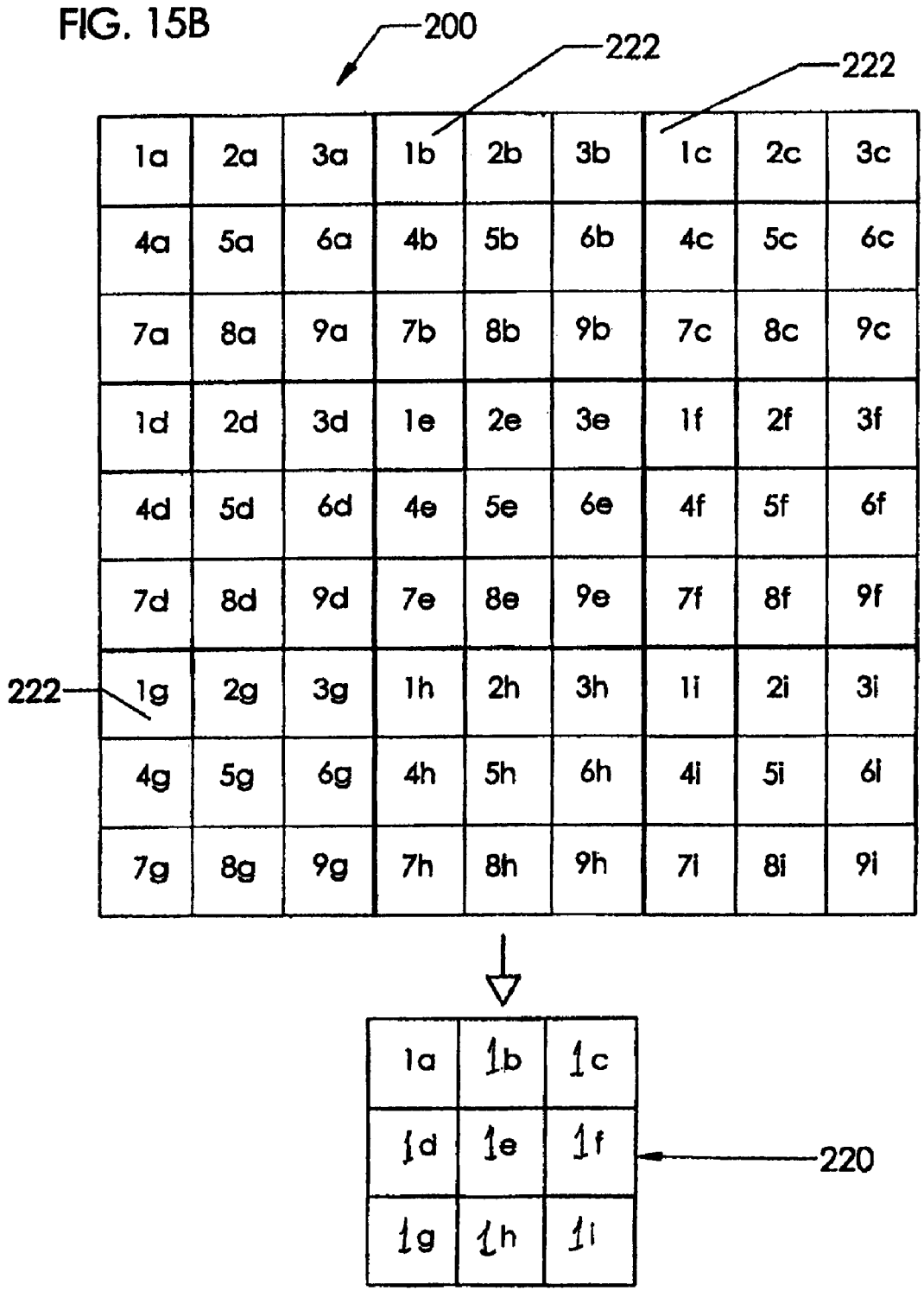

An element, or pixel, is a "piece" of a Source Image, which is located within a Lens Source Group of the Composite Image, as shown in FIG. 15.

The Composite Image, also called the Multiplexed Image, is a convolution of all of the Source Images in such a way that the Lens Array in this invention will allow for deconvolving each Source Image, that is, sorting out, for the viewer, the pixels of each Source Image such that a coherent image is seen. The term also refers to the physical Composite Image, which may be made of various materials, and is located behind the Lens Array. Generally, the Composite Image, without the aid of the deconvolution provided by the invention, looks to the eye like an incomprehensible collection of random spots.

A Lens Source Group is the group of pixels behind a single lens within the Lens Array. There are generally as many Lens Source Groups as there are individual lenses in the Lens Array. In the preferred embodiment, a Lens Source Group includes at least one pixel from each Source Image.

The Lens Array is the array of lenses that are placed in front of the Composite Image. Each Lens of the Array has beneath it a Lens Source Group that contains corresponding pixels from the Source Images.

A Viewable Image is a Source Image as it is seen by a viewer. This image is one of the Source Images, after it has been deconvolved from the other Source Images in the Composite Image by the action of the Lens Array.

Viewer Angular Region refers to the angular range, with respect to the invention, in which a viewer could observe a deconvolved Source Image. That is, it is the region where a Viewable Image can be seen.

In FIG. 14, the general concept of this class of practical application of the invention is shown. It shows the respective positions of a light source 152, a Composite Image 150, a Lens Array 156, and two different Viewable Images 154 within two Viewer Angular Regions 158, as well as example rays coming from selected Lens Source Groups.

FIG. 15A shows a 9-by-9 array of pixels, totaling to 81 pixels 1a-9a, 1b-9b, 1c-9c, 1d-9d, 1e-9e, 1f-9f, 1g-9g, 1h-9h, and 1i-9i, which make up the Composite Image shown generally at 200. The Figure also shows one Source Image 220, which is made up of nine pixels 1a-1i. Each pixel 1a-1i in the Composite Image is a pixel from one of nine different Source Images 1a-1i. The pixels 1a-1i from the Source Images are mapped onto the Composite Image 200 in a specific arrangement.

The Composite Image 200 in the Figure is made up of an array of nine Lens Source Groups 210. Each pixel 1a-1i in each Source Image 220 is labeled with a number and a lower-case letter. The number identifies a pixel as belonging to a unique Source Image 220, and the letter designates the position of each pixel within the Source Image 220. That is, pixels having the same lower-case letter belong to the same Source Group 210, whereas pixels having the same number belong to the same Source Image 220. For example, all pixels designated with the integer "1" belong to Source Image 1. All pixels designated with the lower-case letter "a" belong to Lens Source Group "a".

Figure 16:
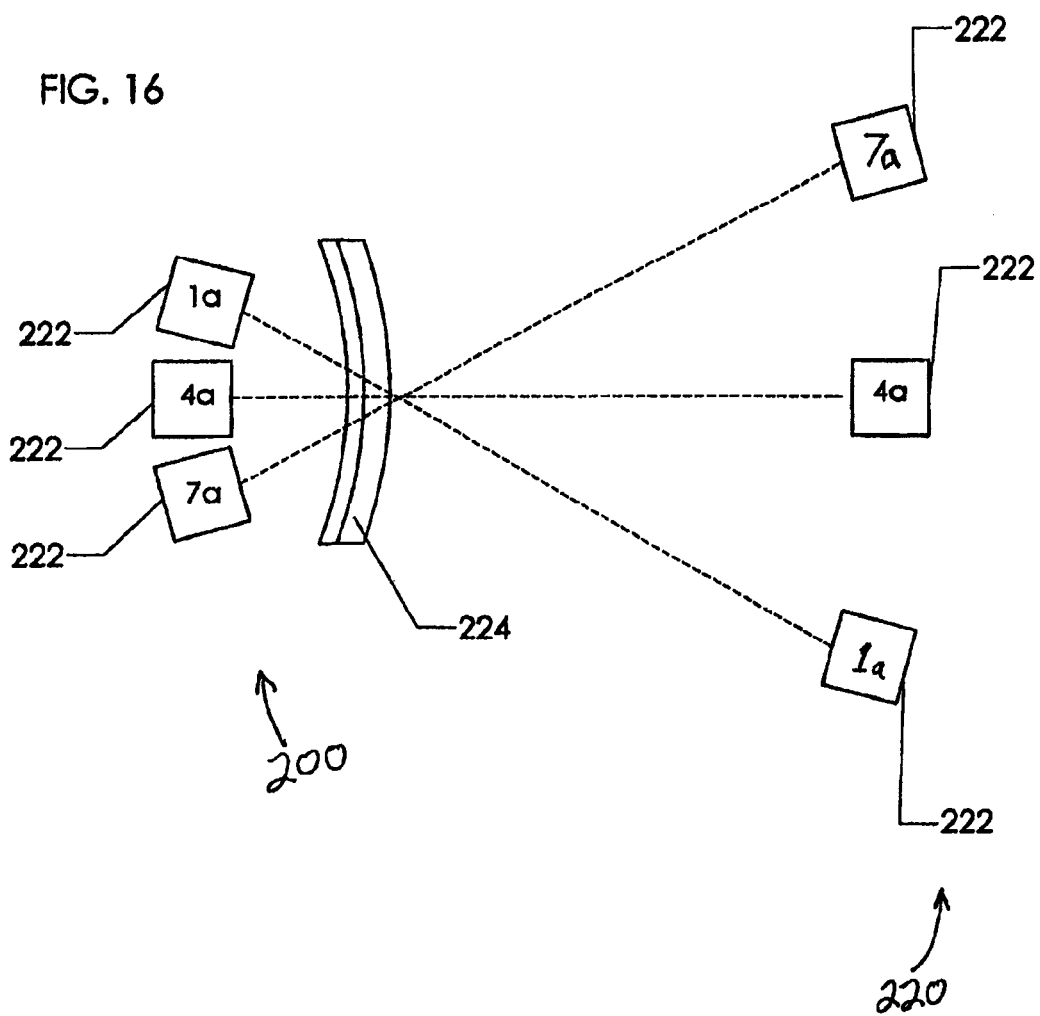
FIG. 16 illustrates the general characteristic of a lens when an image is placed at its focal point, the relation of the pixel placements in the Composite Image to the Viewable Image when central rays come from each of three pixels, and the arrangement of the pixels within each Lens Source Group being very specific, the placement of the pixel being in accord with the characteristic of refractive optics such that its energy is sent in the same direction as the other pixels that make up the source image to be sent toward a viewer.

Pixels 222 are placed into specific Lens Source Groups 210 to achieve coherence of the Source Image 220 once it is deconvolved into a Viewable Image. That is, it is not sufficient that the pixels all be sent away from the array with the same direction, they must also be organized positionally appropriate to create the proper reconstruction of the image. FIG. 16 shows the relation of the pixel placements in the Composite Image 200 to the Viewable Image 220.

The arrangement of the Lens Source Groups 210 within the Composite Image 200 is determined by the letter designation of the pixels that it contains. The arrangement of the Lens Source Groups 210 must correspond to the arrangement of the pixels within the Source Images 220. That is, the relative location of a Lens Source Group 210 within the Composite Image 200 must correspond to the relative location of the pixels 1a-1i within their Source Images 220. If a pixel 1a is located in the upper left hand corner of its Source Image 220, the Lens Source Group 210 that contains that pixel 1a must be located in the upper left hand corner of the Composite Image 200. For example, using the pixels in FIG. 16, the Lens Source Group 210 containing pixel 1a in the Composite Image 200 must be placed in the upper left hand corner of the Composite Image 200 because the location of pixel 1a in Source Image 1a is in the upper left hand corner.

Figure 17:
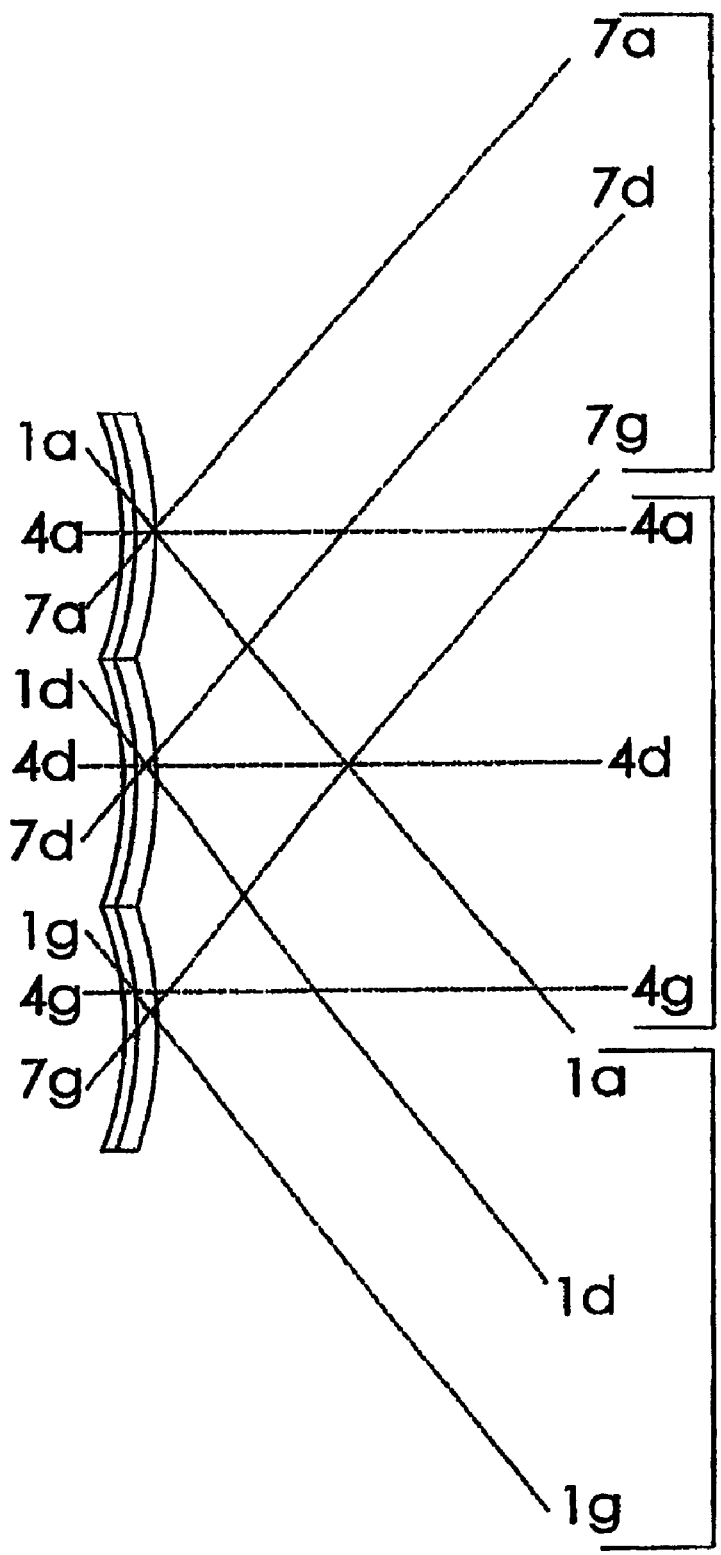
FIG. 17 illustrates the profile of three lenses, matched in focal length, size and location relative to the elements of the Composite Image, with each lens separating the image elements into different directions as illustrated in FIG. 16. In the example illustrated by the figures, a 9-by-9 Lens Array, overlaid on a 9-by-9 Lens Source Group, would deconvolve the spatially multiplexed elements in FIG. 14 to the nine individual Source Images, now Viewable Images.

The arrangement of the pixels within each Lens Source Group 210 is very specific, the placement of the pixel being in accord with the characteristic of refractive optics such that its energy is sent in the same direction as the other pixels that make up the source image to be sent toward a viewer, as shown in FIGS. 16 and 17. It is recognized that there is always some level of bleed during transition of location, but most of the viewing will have no overlap of images in the space for which the image is designed.

This example's use of coincident numbers of Source Images (9) and number of pixels within each Lens Source Group (9) should by no means be interpreted as a necessary condition for this invention. It is the number of pixels within the Source Image with the highest resolution, not the number of Source Images themselves, which determines the number of Lens Source Groups. For instance, the invention could have only one Source Image and 1000 Source Groups, if the Source Image contained 1000 pixels.

The resolution of all the Source Images does not have to be the same. For instance, a system that contained five Source Images could have a Source Image with twenty pixels, and the remaining four Source Images could have varying smaller numbers of pixels. Thus the Composite Image would have twenty Lens Source Groups, but each Source Group would not necessarily contain a pixel from the Source Images with lower resolutions. The number of pixels within each Source Group will vary because the number will depend on the desired Angular Ranges of the Viewable Images. Thus it is up to the designers to use in their art.

Additionally, the pixels within the Lens Source Groups do not need to be the same size. To make a Viewable Image have a larger Viewer Angular Region, the pixels can be made correspondingly larger than other pixels (this will reduce the total Angular Region available for the other Viewable Images).

The Composite Image 200 can be applied to materials that are opaque, transparent, neutral in color, colored, polarized, unpolarized, or any combination of these. The Composite Image 200 can also be projected onto a rear projection screen.

An array of lenses is used to achieve the deconvolution of the interspersed pixels such that distinguishable images are projected toward a viewer. FIG. 16 shows, in profile, the general characteristic of a lens 224 when an image is placed at its focal point. For discussion herein, the lens 224 will be taken as one of the lenses in the Lens Array of the invention. Three representative pixels from a Lens Source Group associated with the lens are shown, 1a, 4a, and 7a respectively. The labeling system indicates that the pixels are from Source Images 1, 4, and 7, and their placement within their respective Source Images is at location "a" (in this case corresponding to the upper left hand corner of the Composite Image 200).

FIG. 16 shows example central rays coming from each of the three pixels 1a, 4a and 7a. The rays emerging from the lens are parallel, because the lens is placed at the focal distance from the pixels. Thus, the rays from each pixel exit the lens in different directions, the directions being dependent upon the lens characteristics and the location of the pixels. This results in the three Viewable Images 222 shown at the three different positions in FIG. 16 being seen at distinct Viewer Angular Ranges, such that viewers located in the different directions from the invention will see correspondingly different Viewable Images.

It is also important to note that the placement of the lens at the focal point causes the rays coming from each pixel to "fill" the lens. This is shown with the rays coming from pixel 7a in FIG. 16. The result of this "filling" is a seamless Viewable Image, even though there is spacing between the Source Image pixels in the Composite Image.

FIG. 17 shows the profile of three lenses, matched in focal length, size and location relative to the elements of the Composite Image. Each of the lenses separates the image elements into different directions as illustrated in FIG. 16. In the example illustrated by the figures, a 9-by-9 Lens Array, overlaid on a 9-by-9 Lens Source Group, would deconvolve the spatially multiplexed elements in FIG. 14 to the nine individual Source Images, now Viewable Images.

Figure 18:
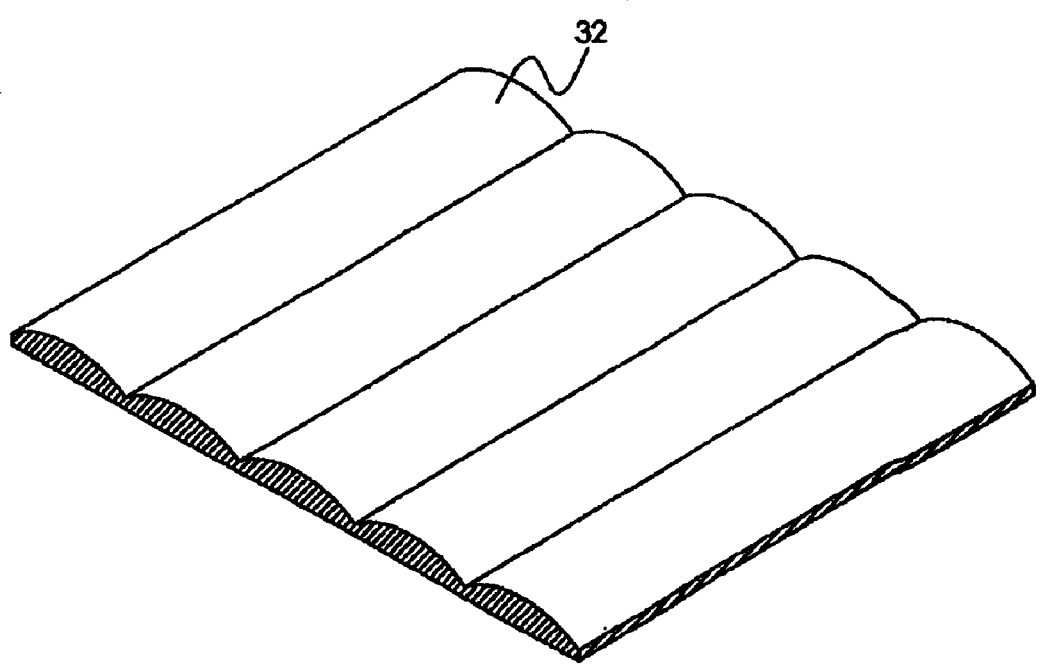
FIG. 18 illustrates a one-dimensional lens array.
Figure 19:
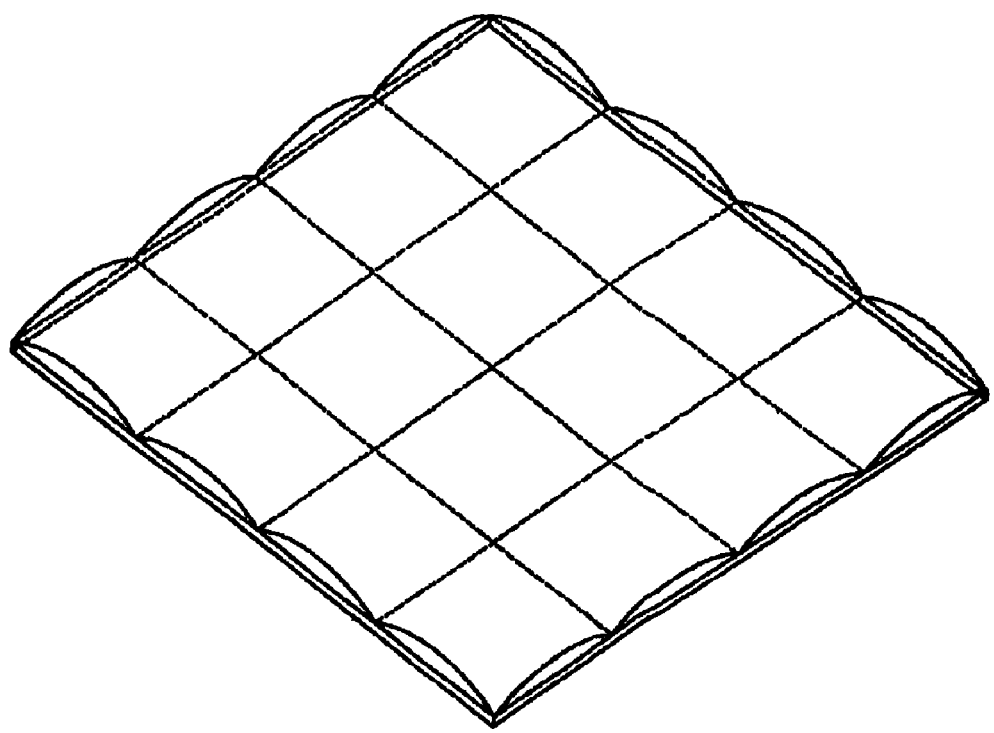
FIG. 19 illustrates a two-dimensional lens array.

The lens array can be either a lens array 32 curved in one-dimension, as suggested by the curved axial array 32 depicted in FIG. 18, or a lens array curved in two-dimensions as depicted by the example in FIG. 19, or a combination of the two. The selection of the array is made as suitable in optical characteristics to deconvolve the Composite Image and project it toward the pre-selected Viewer Angular Region.

It should be noted that there is no requirement for the lenses within the Lens Array to be "perfect" or even the same as the other lenses within the array. If a lens has distortion, adjustment in the image plane can be often made to back out the distortion. Specifically, the pixels within a particular Lens Source Group can be placed to accommodate any defects or differences in the associated lens. Also, no symmetry or uniformity of the Lens Array is required, either in lens placement or focal length.

The light associated with viewing the image can be provided via backlighting, front lighting, or a combination of the two. The light source could also be from a projector in the embodiments where the Composite Image is changed in real time. The light can be neutral, colored, polarized or unpolarized.

As discussed above, the viewer will see multiple Viewable Images. Each Viewable Image will only be seen in a limited Viewer Angular Range, however. The Viewer Angular Range for each Viewable Image is predetermined by the design of the Composite Image and the characteristics of the lenses.

At large angles off of optical axis, the lens performance and geometry may fail to give an appropriate Viewable Image from information placed on the Composite Image. At the larger off-axis angles, pixel content can be achieved by mapping image details onto baffles, which are an element of some embodiments of this invention.

In an embodiment including baffles, that light which is not within the lens' optical performance geometry to refract a pixel's light into a desired direction can still be used to illuminate "walls" located along the edges of the lenses. These walls would simply be like standard lens baffles, except each of the lenses' baffle walls would be provided individual reflection characteristics that, when seen as an ensemble of all the lens baffles, would produce an image in accord with the pattern painted on the ensemble of baffles.

The current preferred embodiment of the invention is the "basic" model of the invention, wherein modifications can easily be made. The basic model includes a light source (either a rear screen projector or other light source), a Composite Image applied to a material or projected on to a rear projection screen, a Lens Array, and several Source Images. It is noted that multiple projectors may be used here and throughout this Detailed Description wherever a single projector is mentioned.

It should be noted that this invention can change the direction of the Viewer Angular Ranges that Viewable Images are sent, not only by changing the configuration of the Composite Image, but also by simply moving the Lens Array and Composite Image transversely to one another, and by altering the curvature of the curved axial optics and orientation (angle and tilt). Also, the number and extent of Viewer Angular Ranges of the Viewable Images can be fine tuned in the design of the Composite Image by changing the size of the pixels. This can be done in real time by using a computer controlled rear projection screen (which would include a TV screen) as the medium for the Composite Image.

The system can be designed such that pixels from a set of high resolution Source Images are only deconvolved into Viewable Images when the Lens Array is well focused. When the Lens Array is slightly unfocused, however, the high resolution Source Image pixels will average together to form the larger pixels of a low resolution Source Image. That is, a group of pixels in each Lens Source Group would form one pixel of a low resolution Source Image. The group of pixels would be designed to average together to have the correct brightness and color for the low resolution Source Image.

The viewing location of a Viewable Image can be based not only on angle from the Composite Image Plane, but also on distance from the invention. This effect can be achieved by slightly offsetting a Source Image's pixels such that the light beamed out from the individual lenses in the Lens Array no longer runs in the same direction, that being a parallel direction for every lens. Instead of beaming light out in parallel for every lens, the lenses direct the light out such that the beams cross over at some modest distance from the Composite Image plane. Therefore, it is possible to combine the distance and angle attributes in such a manner as to produce a visually dynamic sign that changes markedly as a viewer moves, not only side to side or up and down in front of the invention, but also as a viewer moves closer and farther away from it. This embodiment of the invention requires careful design involving the subtle trade off of several optical parameters.

III. Curved Axial Optics Using Reflective Film

The foregoing description of various practical applications of crossed axial optics has occurred in the environment where the axial curved optical arrays have been transparent. However, it is further understood that additional practical applications may occur in the environment where the axial curved optical array has one surface that is reflective. With a suspended film 104 having one side that is reflective, entirely new practical applications are presented. Particularly suitable pliable, deformable films 104 that provide one side that is reflective include those from aluminized Kapton (0.5 to 1.0 thousandths of an inch thickness) from Dunmore Corporation, 145 Wharton Road, Bristol, Pa. 19007-1620 and aluminized polyester from Sigma Technologies of Tucson, Ariz. Another suitable film that is non-metallic and reflective is produced and sold by 3M Company. It should be appreciated that these films are used because they are already reflective. However, it is possible to form a non-reflective optic, and then give the optic a reflective quality by simply aluminizing or otherwise spraying or applying a metallic/reflective layer.

III.A. Reflective Multi-Image Surface

Once this film 104 is utilized, a reflective multi-image surface may be produced. Such a surface is the subject of co-pending U.S. Non-Provisional Application filed on Nov. 18, 2004 titled Reflective Multi Image Surface, and which is hereby incorporated by reference in its entirety.

III.B. Front Projection Screen

In addition to the foregoing practical application which is the subject of a separate application, a front projection screen may also be created. The description below provides specific detail on how such a screen may be achieved.

The contrast of a projected image is subject to the intensity of the observable projection light relative to the intensity of the observable light from background sources. Increased intensity of observable light from background sources in the viewing environment correspondingly reduces an observer's ability to see the darker parts of the projected image, thus contrast limitation in a lighted viewing environment is most often imposed by the loss of darkness in elements of an image, rather than influences of background light on the brighter parts of an image.

If there is no background light falling upon the screen that ultimately can be seen by an observer, then the observer has the ability to see the contrast inherent in the projected image, assuming that there is at least enough light in the projection to rise above threshold limits of eye sensitivity; and assuming that the screen itself does not deteriorate the contrast via transverse diffusion of the projected light (crosstalk). One way that background light rejection can be achieved is by removing non-projection light from the entire vicinity of the observer's eye (e.g. use a darkened room). But other options become apparent when considering that it is the background light that is ambient in the viewing environment seen by the observer that creates the problem, not the presence of the environmental light itself. Accordingly, even in the situation where there is intense environmental background light, the conditions favorable to maintenance of the projected image's inherent contrast can still be achieved. This is possible by using a projection screen that diverts any background light that strikes it away from the sight of the observer.

The contrast of an image projected onto a screen can be improved by increasing the image brightness, by reducing the background light's influence, or by a combination of both. Improving contrast by approaching the first option (increasing brightness) involves limiting the volume into which the projected light is scattered by the screen, thereby increasing the viewed brightness of the image achieved by any set amount of projection light. Considering the second option (reducing background light), the contrast can be improved by limiting the volume from which light striking the screen from sources other than the projector can be redirected into the volume containing the audience. This invention's approach to achieving these contrast improvements introduces an additional possibility. The utility of the invention as a contrast-enhancing screen can provide an angular screen-reflection profile in which the light from a projector is concentrated towards the viewer, and that the projection light falls off sharply when the viewer moves to a position outside the designed viewer volume. Such sharp fall-off of intensity thereby adds the possibility of putting multiple, non-interfering images upon one screen, with each image being observable only from within its own peculiar viewing volume.

This application is a continuation-in-part of U.S. application Ser. No. 10/993423 titled Variable Optical Arrays and Variable Manufacturing Methods filed on Nov. 18, 2004. The invention provides for all three elements of the advantageous screen described above. Further, the invention also is more readily manufactured than other possible solutions for the production of screens having similar properties. This advantage is derived from simplicity of tool-making and modest cost of materials (to name but two elements of advantage).

Figure 20:
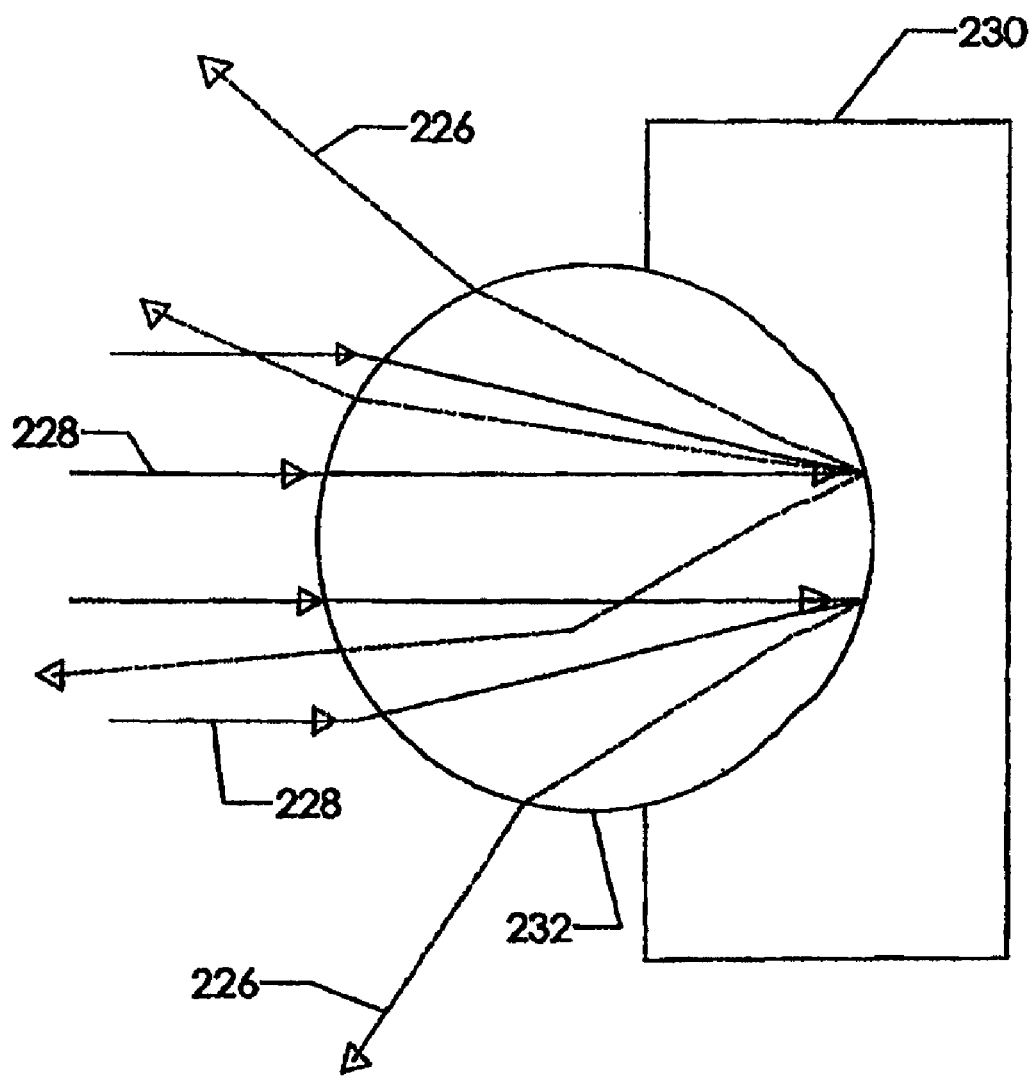
FIG. 20 illustrates the basic idea of glass bead screens.

Other technology has been employed in attempts to achieve increased contrast for projected images. For example, compared to simple diffuse white reflection surfaces (e.g. white paint and/or plastic diffusing sheet) there is an intensity advantage to using tiny glass beads 232 attached to the surface of a reflective sheet 230. The small beads 232 act as tiny lenses that concentrate the light 228 into a smaller viewing volume than that characteristic of white paint coatings and plastic diffusers. The basic idea of such glass bead screens is illustrated in FIG. 20.

Figure 21:
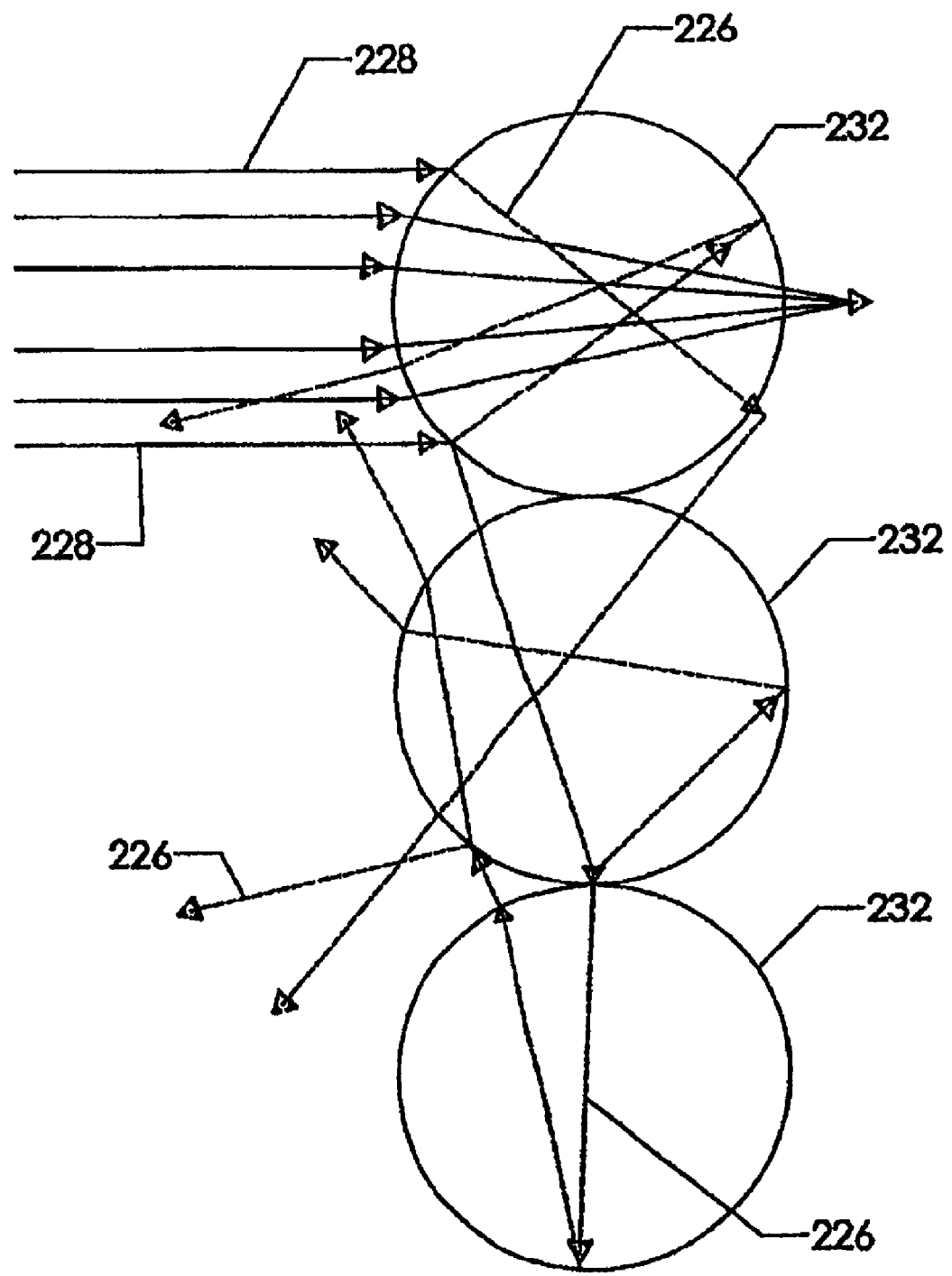
FIG. 21 illustrates the crosstalk issues associated with glass beads.

Although some light intensity gain is achieved with glass bead screens, cross-talk (inter-pixel bleeding) is a significant deterioration observed with screens that use plastic diffusers and/or glass beads. In the case of plastic diffusers, the scatter of light 226 is somewhat isotropic, which allows lateral spread of light within the diffuser. Such lateral spread causes loss of contrast and color integrity of spatially-fine elements in a projected image. Glass beads 232, being spherical in shape, also produce a similar lateral spread 226 between beads 232. Among the other reasons for this cross-talk are (1) the fact that the light's internal multi-bounce 226 at refractive index interfaces leads to geometric migration to a lateral direction, and (2) the fact that the curvature of the spherical beads provides higher and higher incident angles as the projected light approaches the outer (tangent) edges of the sphere. The reflection coefficient, in accord with Fresnel relationships, grows higher for tangential angles. This accentuates the cross-talk problem even before the light 228 enters the bead 232. FIG. 21 depicts the cross-talk issues associated with glass beads 232.

Clearly, most of the refractive sphere does not contribute to focusing the reflection of the projected light back to a selected and sharply-defined viewing volume. Only a small part of the sphere is helpful to that purpose. The remainder creates diffusivity that not only cross talks with neighboring spheres 232, but also sends the projected light to regions well outside the desired viewing volume 226.

This invention, although it uses refractive elements, does not incorporate those parts of a refractive shape that are not contributors to reflecting light distinctly into the desired viewing volume. In effect, only a selected part of a refractive solid is used. Further, instead of the use of an array of closely packed glass spheres, and other such bi-directional refractive solids, closely-spaced refractive cylindrical elements (one-dimensional refractors) are used. Here, as stated, only a selected and appropriate portion of the refractive cylinder is employed, otherwise the same type of cross-talk as encountered with the glass spheres will result along the cylinders' cross-axis. (Note that segments of non-circular cross-sections are anticipated for the "cylinders" in the scope of the invention, the exact shape being as needed to achieve limitation of reflected projection light to a desired viewing volume.)

Figure 22:
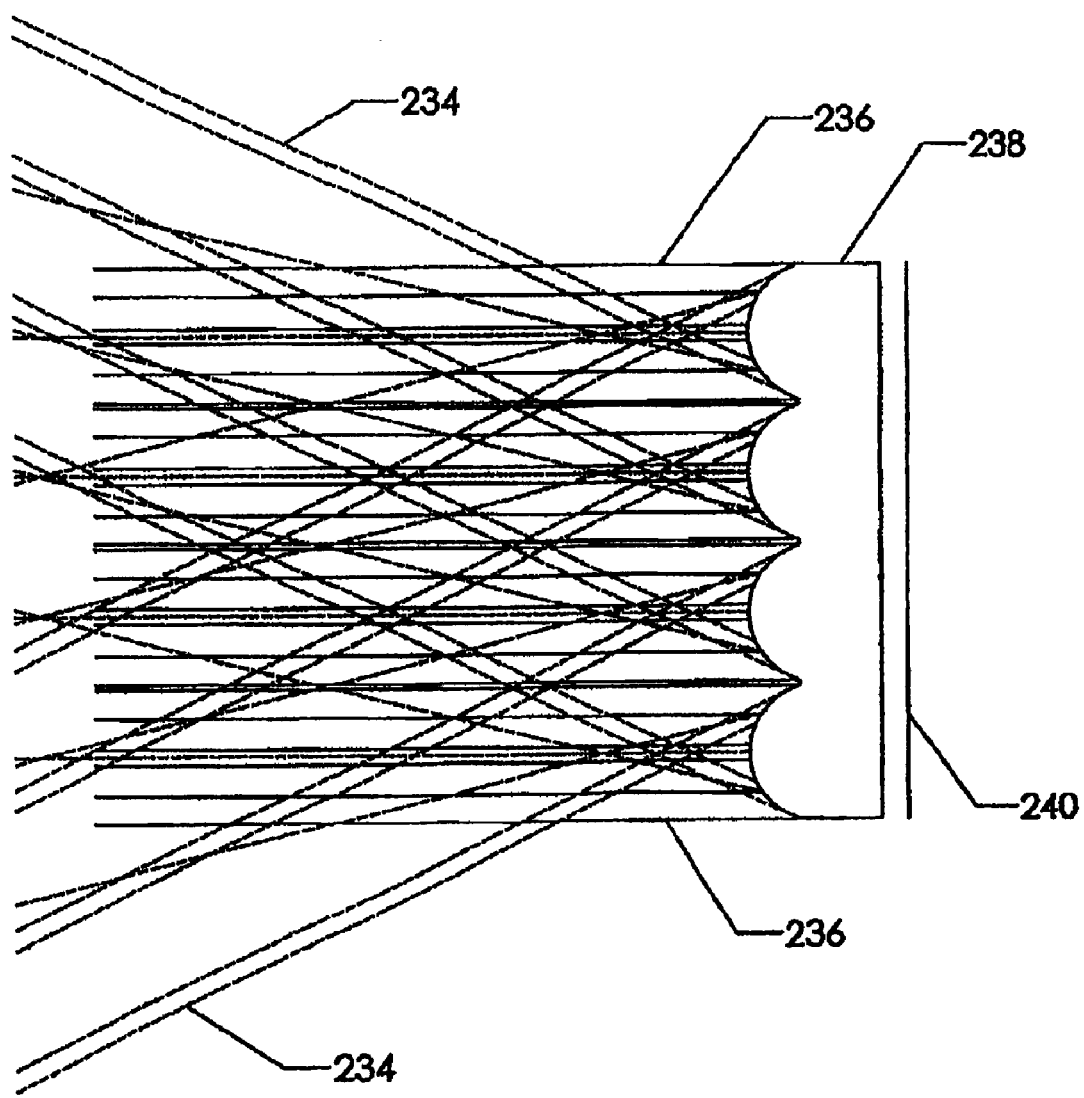
FIG. 22 illustrates incoming projector light passing into the cylindrical lenses and reflecting back out through the same lenses which are backed by a specular reflector.

The incoming projector light 234 passes into the cylindrical lenses 238 and, if the lenses 238 are backed by a specular reflector 240, reflects back out through the same lenses 238 as depicted in FIG. 22. The effect of the lens array 238 is to disperse the reflected light 236 in one plane transverse to the plane of cylindrical axes, but without significant dispersal in the other transverse plane. With proper parameter selection, the reflected light 236 can be contained in a small, well-defined dispersion angle. If the arc of the lens 238 is modest, then a great deal of the incoming projection light strikes the lens surface at a near-normal angle. This results in a high percentage of the light 234 entering the lens (significantly more light than with the glass bead approach, as illustrated previously in FIG. 21).

The value of increasing the efficiency of light entry extends beyond the desire to subject more of the light to the refractive effects of the cylindrical lens. Reduction of front-surface reflection is important to maintenance of a sharp angular cutoff profile. As will be discussed shortly, the invention seeks to reserve reflection processes for the projection light to that caused by a reflective surface imposed after the light has passed through the cylindrical lenses.

If enhancement of the percentage of entry of light into the refractive cylinder material is desired, the surface of the cylinder can be covered with an anti-reflection coating to reduce the effect of abrupt refractive index changes. In this invention, the addition of an anti-reflection layer to the refractive surfaces is easily achieved by using a film whose refractive index is less than the refractive index of the cylinder's substrate, with the ideal anti-reflection index of the film being the square root of the cylinder substrate's index.

Figure 23:
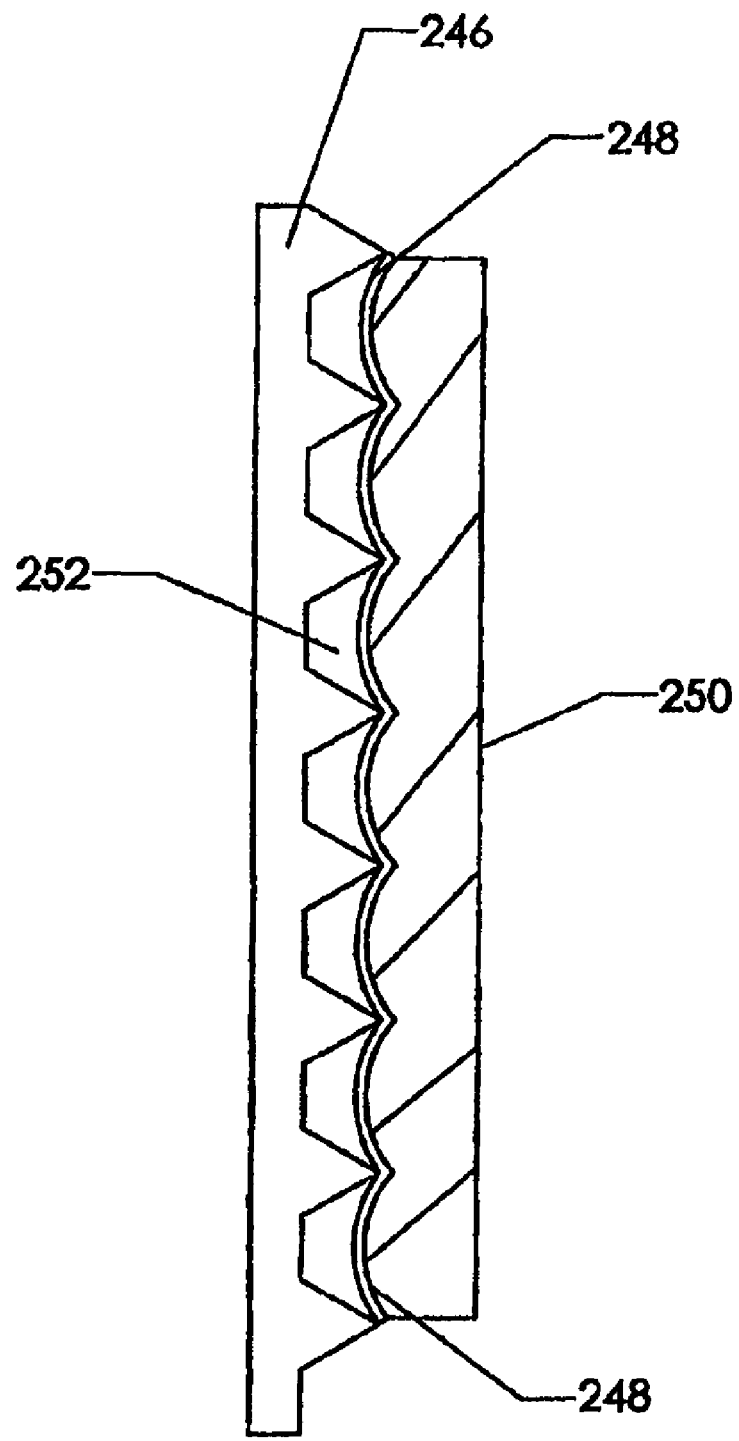
FIG. 23 illustrates one example of a film-suspension arrangement for creation of the closely-spaced cylindrical lens array.

Even if an anti-reflection layer is not desired, the material 248 can still be used to obtain a very high finish surface for the lens. In fact, in one manufacturing embodiment of this invention, such a material is used for separation of the finish of the surfaces (both refractive and reflective) from the figure of the surfaces. This is achieved by the use of films 248 suspended between narrow structural elements 252 for both the refractive and the reflective surfaces. FIG. 23 illustrates one example of a film-suspension arrangement for creation of the closely-spaced cylindrical (curved axial) lens array 248.

Figure 24:
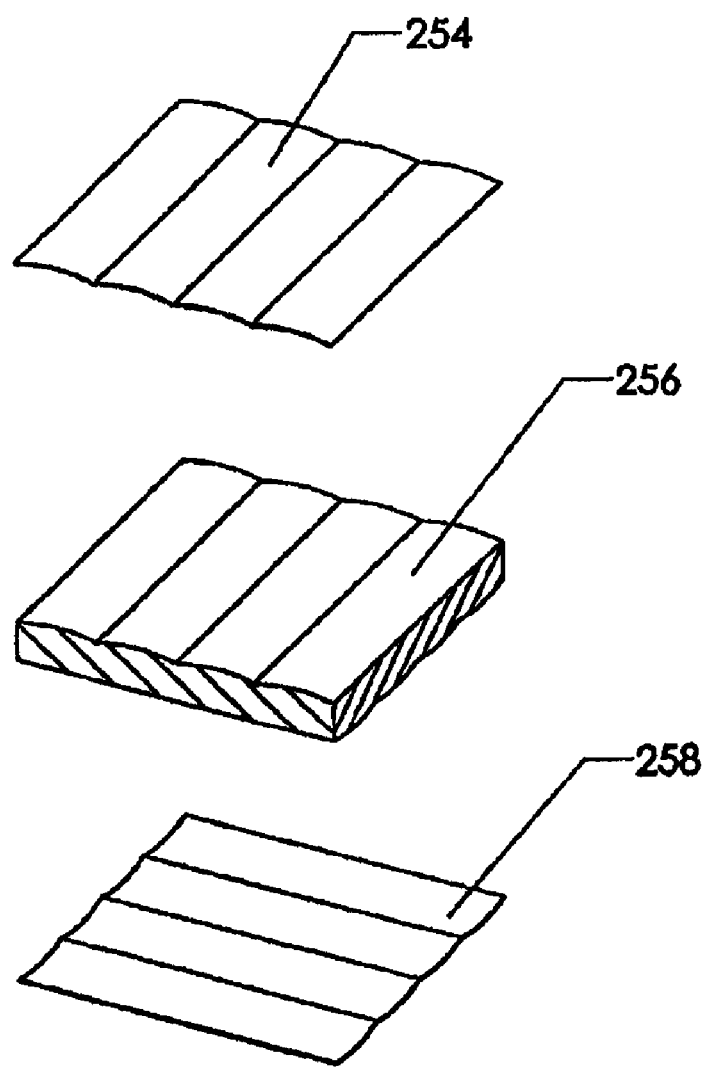
FIG. 24 illustrates the overall concept of clear film adhered with cylindrical morphology to bulk clear refractive fill material plus reflective film adhered with cylindrical morphology to the opposite side of the bulk fill.
Figure 25A:
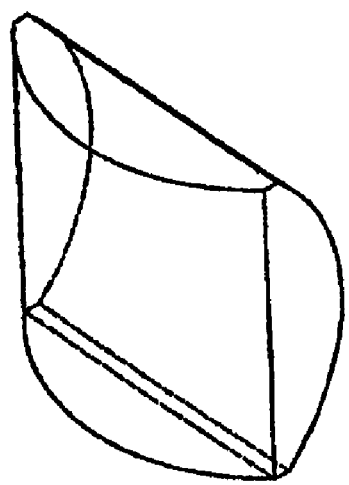
FIG. 25A illustrates a front elevated view of a typical individual cell, in which the effect of the arrangement in the invention is to produce a matrix of projection screen reflective cells with many advantages over traditional front projection screen technology, such as high-gain improved contrast and multiple imaging capabilities.
Figure 25B:
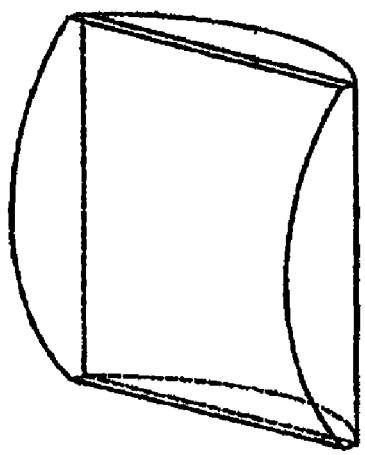
FIG. 25B illustrates a side elevated view of the cell of FIG. 25A.
Figure 25C:
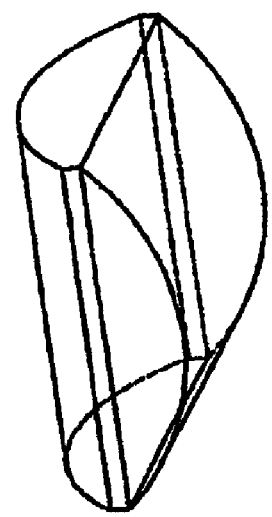
FIG. 25C illustrates an elevated side view of the cell of FIG. 25A.

In addition to the use of the cylindrical lens array 256, this invention uses a non-planar specular reflector 258 behind the cylindrical lens array 256, thereby making the invention a catadioptric system. An example reflector would be an array of closely-spaced portions of nominally cylindrical (curved axial elements) reflectors 258. This reflective array 256 is created by film suspension 254, 258 in a manner similar to the production of the refractive array of FIG. 10. The orientation of the cylindrical mirror axes is not the same as for the refractive cylinders. With this non-aligned condition, the cylindrical mirrors 258 will disperse the projection light along an axis different than the dispersion produced by the refractive cylindrical elements 254. FIG. 24 illustrates the overall concept of clear film 254 adhered with cylindrical morphology to bulk clear refractive fill material 256 plus reflective film 258 adhered with cylindrical morphology to the opposite side of the bulk fill 256. (Although the figure shows the axes of the refractive 254 and reflective 258 elements to be at right angles, such is not a requirement for all embodiments of this invention.) The effect of the arrangement in the invention is to produce a matrix of projection screen reflective cells with many advantages over traditional front projection screen technology, such as high-gain improved contrast and multiple imaging capabilities. A typical individual cell might be as shown in FIGS. 25A, 25B, and 25C.

Figure 26:
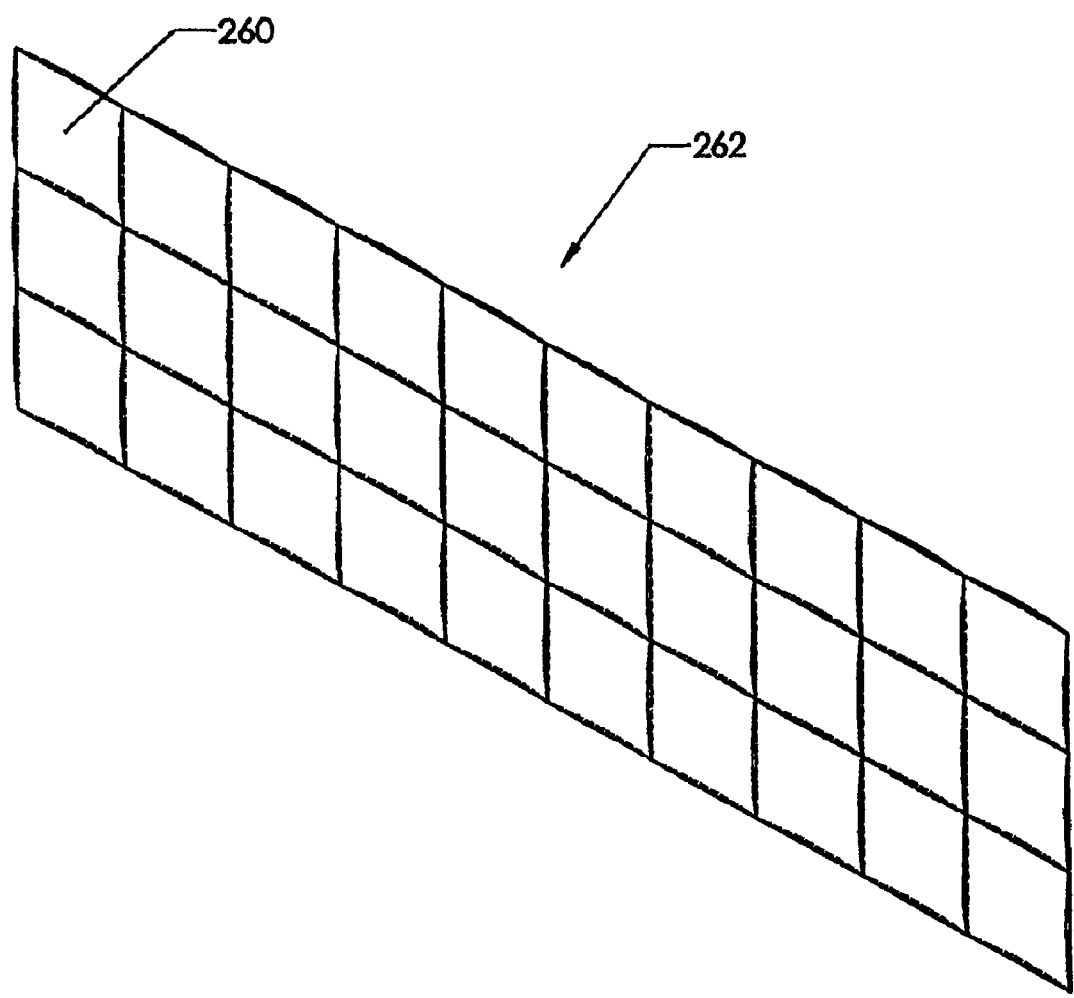
FIG. 26 illustrates a highly flexible screen where small cell size leads to a thin, flexible screen.

Several factors govern the selection of the thickness of the transparent bulk fill material 256 in the cell arrangement (this invention anticipates gaps of either gas, liquid, or solid in the transparent bulk fill material). In most cases, avoiding cell-to-cell cross-talk will be important. This can be attained by keeping a small distance between front and back surfaces. The refractive light-deviation takes place at the surface and the inner material has no other major effect than to provide focusing space. For most designs, there needs to be enough distance from the refractive surface to the reflective surface for the light to move transversely. However, the thickness should not be so great as to allow the rays to cross over between cells, thereby exiting a different cell than they entered. If the cells 260 are made small, then the thickness can be kept quite small, even such that the screen 262 can be made highly flexible. FIG. 26 illustrates a highly flexible screen 262 where small cell 260 size leads to a thin, flexible screen 262.

The embodiment of this invention shown in the above figures uses film suspension to create the arrays of cylindrical-like lenses and mirrors. This is a useful and unique feature in that it facilitates separation of the creation of the finish of the reflector surface from creation of the figure of the reflector surface. (Note that the film 165 or 248 can lightly touch the tool 134 or 246 as seen in FIGS. 10 and 22 and still retain separation of finish and figure as long as the film still suspends across negative tool marks. Although film suspension has particular advantages, the invention anticipates use of other shaping approaches such as obtained with injection molding, plating, depositions, etching, and other standard chemical and mechanical techniques such as embossing, stamping and chemical shaping.

In the preferred embodiment, simple tools 134 or 246 are prepared for suspension of transparent 254 and reflective films 258 across spans between a series of ridges, best shown in FIG. 10 and FIG. 22. The shape of the top of the ridges crosswise to their linear orientation can be any geometry as suits the application, but in general a thin crest is desirable. The invention, as stated earlier anticipates that the shape of the ridges along its extension need not be a straight line. In fact, the invention anticipates advantage in some circumstances to providing curvature to the ridge either laterally, in depth, or both.

The suspended film 165 or 248 is caused to deform to a desired figure (shape) using application of forces imposed by either gravitational, centrifugal, magnetic, electric, differential pressure, or any combination of influences thereof. In the case of gravitational and centrifugally induced deformation, the elasticity and mass of the film 165 or 248 are major elements in the deformation resulting from the force. With magnetic and electrical techniques, the magnetic and electrical field strengths between the span of the tool's bottom and the film combine with the film's elasticity as primary elements.

In the case of differential pressure forces, the film 165 or 248 is surrounded by fluids (gas, liquid, or a combination of both) separable to each side of the film 165 or 248. A differential fluid pressure is applied to opposite sides of the film 165 or 248 to form uniform deformation to a desired figure.

In any or all of the aforementioned productions of force to deform the film 165 or 248 into a desired figure, the properties of the film 165 or 248 can be modified by application of temperature and other variations in the physical and chemical environment to which the film 165 or 248 is subjected. This invention anticipates application of such conditioning.

The series of ridges seen in FIGS. 10 and 22 serving as edges of suspension for the film have been designed to be sufficiently high, relative to the depth of the span between the ridges that, during deformation to the desired figure, the film 165 or 248 need not touch the tool 134 or 246 beneath it in the areas below the suspension. If contact does occur the pressure against the tool can be kept so light that the finish of the tool will not be transferred to (imposed on) the figure of the film 165 or 248. (Note: as stated earlier, reflection material can be applied to the mirror surface either before or after the suspension process, and both are anticipated by the invention.)

When the forces on the suspended film 165 or 248 have produced the desired shape, bulk transparent material is applied. This material can then be cured or otherwise solidified (via cooling, chemical interaction, etc.) to secure the lenses' shapes. The chemical, optical and physical properties of the film 165 or 248 used for production of the cylindrical lens surface can be significantly different than the corresponding properties of the bulk material that is used to secure the desired optical figure of the lenses. These differences can be selected to advantage. For example, if the optically transparent bulk material 256 is a standard epoxy, then several transparent film chemistries are available to produce a more robust protection against environmental and mechanical (scratch, etc.) offenses to the lens array. Further, as mentioned earlier, the index of refraction of the film 165 or 248 can be chosen to be appropriately less than that of the bulk material, thereby producing a hard antireflection shield for the bulk material.

The array of cylindrical mirrors is made in a similar manner as to the making of the array of cylindrical lenses. That is, film 165 or 248 is suspended across a series of ridges and deformed in any of the manners described for the lens array fabrication, then solidified in figure by the use of a bulk substrate. However, in this case, the film 165 or 248 is to be made reflective, either before, during, or after suspension and solidification. (As discussed earlier, the orientation of the cylindrical reflector array is purposely different than the orientation of the cylindrical refractor (lens) array.)

In the preferred embodiment, the lens film 254 and the mirror film 258 are suspended with the two tools facing each other at the same time. A barrier wall is placed around the edges of the two-tools such that bulk material 256 can be poured between the two films 254 and 258, without leaking out from between the films 254 and 258, to simultaneously lock both films 254 and 258 and their shapes into a monolithic piece, as can be pictorially conceived by collapsing together the three elements shown in FIG. 24. The invention anticipates that the bulk fill 256 can be provided in multiple steps with pieces adhered together rather than a monolithic fabrication.

This preferred embodiment would include making at least one of the suspension tools from a visually and ultraviolet transparent material 256. This would allow visual inspection of the films 254 and 258 and the bulk fill material 256 as they are introduced during fabrication, followed by UV curing of an appropriate polymer once the appearance of the films and bulk material is acceptable.

A general characteristic of this invention allows differences in the figures (curvatures) of the refractive and reflective morphologies. In fact, it is anticipated in this invention that they will often be designed to be different.

Further, it is anticipated that among the morphology options, advantage can be taken of the shaping options of the transparent bulk fill 256 to create small prisms (meaning light bending articles including prisms, step-index films, or other light-bending materials) that facilitate canting the reflected light. This means that screens 262 made with high gain will not have to be formed into a curvature to achieve needed viewer volume across the entire expanse of a large projection screen 262. The invention can achieve this prismatic advantage by stair-casing the height of the suspension ridges, and pulling some of the clear film 254 tight against the wall on its neutral side (the backside of a resultant prism, where projection light does not impinge). One alternative to the stair-casing embodiment is the embedding of prisms whose index of refraction differs from the index of refraction of the bulk fill 256.

III.C. Performance Measurement of Crossed Array Screens

There are various ways to measure the performance of crossed array screens.

III.C.1. Performance Measurement:Light Attenuation

Whether the pressure to create the catenary-like cylinders originates from fluid or softened solid, the optical characteristics of the filler material 256, 284 has considerable significance associated with many performance factors, including enhancing image contrast. For example, consider reduction of the influence of off-axis light along the vertical axis from overhead lighting that might reduce contrast. Use of a 100% transmissive filler material may not be the optimum choice for preserving a higher contrast. In fact, the purposeful application of attenuation can be beneficial, whether chromatically neutral or chromatically variant.

Figures 31, 32:
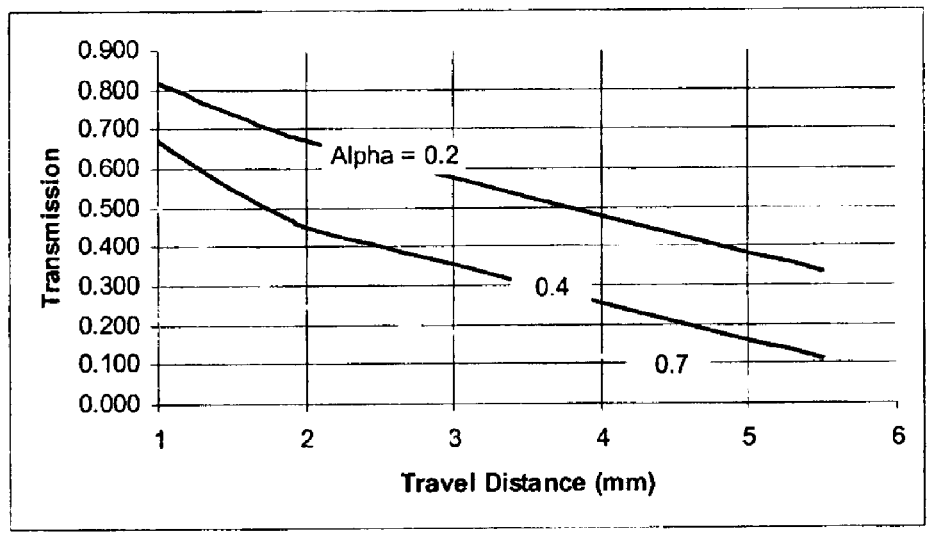
FIG. 31 is a chart illustrating the effect of light's travel distance on its attenuation.
FIG. 32 is a graph showing light's travel distance versus transmission for three different attenuation coefficients.

FIG. 31 illustrates, where alpha is the attenuation coefficient, the effect of light's travel distance in three different conditions of absorption. When the light travels greater distances through the medium, then the attenuation of the light is greater. If the projector is illuminating the screen from a near-perpendicular perspective, then off-axis light, such as might come from overhead lights, will strike the screen obliquely and will travel within the filler material 256, 284 at an angle that increases its travel distance compared to the distance traveled by the projector light. Accordingly, the loss of contrast due to the influence of contributions of environmental overhead lighting to the overall image will be reduced. This will enhance contrast by helping to preserve the depth of the dark elements in the projected image.

The comparison of projection light to overhead angled light as a function of travel distance is understood in part by reference to FIG. 32, which shows the ratio of absorption over a 1 mm path to that for other distances. In FIG. 32, the thickness of the hybrid screen is taken as 0.5 mm. Using FIG. 31 and FIG. 32, one sees that the willingness to give up 7% of the projection light allows a potential for a 250% reduction of influence for off-axis overhead light that travels 5.5 mm in the material before adding to the projection image light. This preserves dark areas of the projected image elements that are intended to be dark.

Example values for the hybrid screen 280 of the present invention that have been measured include a chromatically neutral component of the attenuation coefficient for the filler material that is less than 0.1/mm, 0.1/mm to 0.5/mm, and 0.5 to 1.0/mm.

III.C.2. Performance Measurement:Angular Cutoff and Intensity

The hybrid screen 280 can be characterized as having the ability, if desired, to have a rapid angular cutoff of light power in the vertical angular dimension. This is an important attribute for reducing the contamination of the projected image light by the light from overhead lamps. The hybrid screen 280 of the present invention has a vertical fall-off intensity of less than 2% of peak energy per degree within the design viewer volume. Then, at the designed vertical angular cut-off point, the intensity can fall off at the rate of between about 10% to 50% per degree, and more typically the intensity can fall off at the rate of between about 20% to 50% per degree. Although the intensity may easily fall off at the rate of between about 10% to 20%, the numbers below illustrate that the fall off rates for a series of typical design measurements of actual product, with values in percent falls generally in the range of between 20% to about 50%:

| 23 | 48 | 35 | 28 | 22 | 23 | 20 | 32 | 41 | 34 | 25 | 26 | 31 | 34 | 33 | 28 | 32 | 27 |

III.C.3. Performance Measurement:Reflection

Reflection relates to screen-cell cross-talk levels for screens that have a cellular pixilated character. Within this definition is also included, but not limited to, screens that comprise four-sided cells. There is no prior art known to the inventor relating to cellular pixilated screens having reflective/refractive optical elements. Accordingly, the performance measurement regarding screen reflection has been itself created by the inventor. For normally incident projection light illuminating the screen, the cellular (screen pixel) level of cross-talk experienced by the adjoining cells along the vertical and horizontal axes according to the present invention is less than 1% on average, and may fall between less than 1% and 5%; this measurement is made using screen-cell height/width ronchi rulings to independently measure vertical and horizontal cross-talk of individual cells. Cross-talk determination is to be made on no less than a 100 screen pixel by 100 screen pixel contiguous area.

III.C.4. Performance Measurement:Resolution

Resolution relates to modulation transfer on screens that have a cellular pixilated character. Within this definition may also be included, but not limited to, screens that comprise four-sided cells. As stated above, there is no prior art known to the inventor relating to cellular pixilated screens having reflective/refractive optical elements. Accordingly, the performance measurement regarding screen resolution has been itself created by the inventor. For normal projection onto the screen, the modulation transfer of the screen using ronchi-ruled images where the projected bar width equals the screen cell width is greater than 90%; where the projected bar width equals two screen cell widths the modulation transfer is greater than 95%; where the projected bar width equals three screen cell widths is greater than 98%. These are determined using a 100-pixel by 100-pixel sampling window with a 20-pixel slide in both horizontal and vertical directions over the entirety of the screen. The accepted value for the parameter is a mean based upon at least a 90% confidence level and a requirement of a confidence interval of less than 2% of the mean. Outside these confidence levels and means, the measurement will be considered not applicable.

III.D. Performance Enhancement by Introducing Striation

No matter what form of filler material 256, 284 is used, if the outer surface of the front film 104 is smooth, then projected light will produce a bright line in the image as a result of reflection resulting from the index of refraction transition between the air and the film. This is a distractive feature that can be mitigated by providing a non-smooth surface morphology to dissipate the line into a larger field of vision. However, this non-smooth surface preferably will not have roughness features that are so small as to cause scattering effects that negate the refractive desires for the underlying cylindrical lenses. An example surface would have random orientation of "mounds" that are a tenth of a hybrid screen pixel in width and a tenth of that in height, with slopes having moderate pitch.

With such surfaces, however, overhead lighting can find surface angles conducive to entry into the filler material. This is because the advantages of reflection away as a result of index of refraction differences relative to entry angle are not optimal for light rejection. When the overhead environmental light strikes the lens surface at an oblique angle, much of the light will be reflected at the front surface and not enter the screen. Accordingly, there is an advantage to maintaining oblique angles to the overhead lighting while at the same time dispersing the bothersome retro-reflective line produced by the projection light.

Figure 29C:
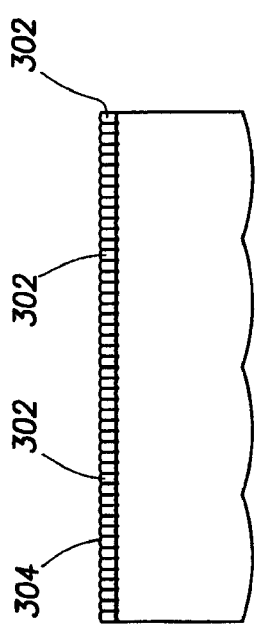
FIG. 29C is a side view of the crossed-array screen of FIG. 29A.

This can be achieved by providing, as seen in FIGS. 29A, 29B, 29C, 29D, and 30A, a front surface shown generally at 300 on the screen 301 that has striations 302 oriented cross-wise to the lens orientation. The profiles 304 of these striations 302 can vary in cross-sectional morphology from smooth undulations to multi-facets, to combinations of the two. For purposes of illustration, a preferred convex surface 304 is shown in FIG. 29C. A concave surface striation profile may also be provided and could provide good optical results, but such a surface profile leaves it more vulnerable to abrasion than with a convex surface. For any striation 302, the height of the striation must be at least 0.1 of the width of the striation 302.

As an example of possibilities with the attenuation and striation combination to improve the contrast ratio by a factor of two for a hybrid screen 280 with thickness of approximately 1 mm and pixel cell size of 1 mm by 1 mm, the following parameters might be used:

(1) Increase the absorption coefficient of the filler medium to greater than 0.19/mm.

(2) Provide a vertical striation scattering profile to the front surface of the screen rather than an "isotropic" scattering profile, wherein the frequency of the striations is at least 5 striations per cell.

(3) Take advantage of the critical angle for the refractive index of the filler (approximately 1.5) to hold within it the vertically off-axis light so that it travels further in the medium via total internal reflection (TIR). An averaged length-entrapment value of at least 5.5 is likely. This means that any vertically off-axis light above about 60 degrees that enters the medium of the screen face will travel an average of at least 5.5 times further than the projection light, thereby being attenuated by a factor of at least 2.3 times more than the projected light attenuation.

Figure 30A:
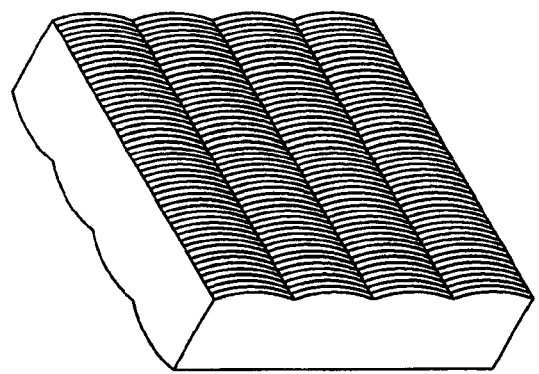
FIG. 30A is an elevated rear view of the crossed-array screen of FIG. 29A.
Figure 30B:
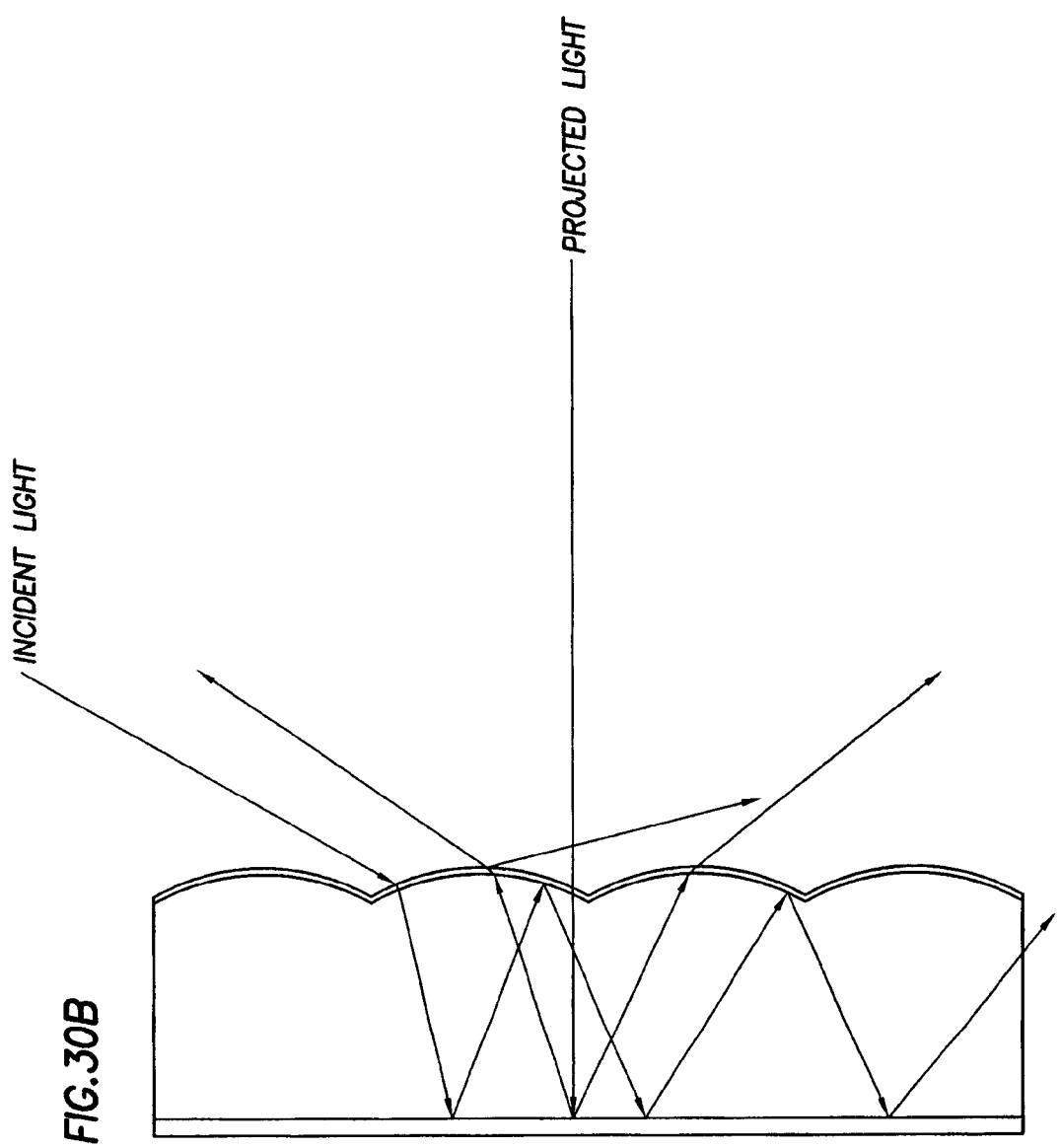
FIG. 30B is a rotated section rear view of FIG. 30A, showing various light paths.

The means by which this is achieved can be understood by review of the overall concept and in reference to FIG. 30B. For enhancing the contrast ratio, we want to minimize overhead light entering the attenuating screen medium. For that Incident Light that does enter the screen medium seen in FIG. 30B, it is advantageous to entrap that light so that its path in the attenuating screen medium is long, thereby allowing the medium to attenuate it before it exits the screen.

Use of a random surface diffusion morphology means that the entry angle of overhead light above 60 degrees can still enter the screen and not take advantage of the Fresnel reflection coefficient to reject it. Furthermore, when the light has entered the screen, it is less likely to become entrapped via total internal reflection (TIR) because it will hit the front surface at angles above the total internal reflectance angle.

The part of the reflector cylinder where the angle is less than 2.5 deg will not contribute to the azimuth enough for the reflection to meet the TIR condition. However, the region where the angle is greater than 2.5 deg will cause a reflection that meets the TIR condition. This will continue with multi-bounce on the reflector until the angle condition is undone.

Note that the azimuthally off-axis component of the incident light from above 60 degrees already has some likelihood of producing a TIR condition by itself unless it is undone by the reflection.

Using the refraction equation, we see that at incidence angle i=60, the refraction angle r=35.5. This is less than what is needed for total internal reflection (42 degrees) with the typical film and filler materials. However, the reflection off of the back of the hybrid screens vertical cylinders adds a few degrees to the angle, thereby setting up total internal reflection.

Off axis background light above 60 actually hits the striated surface at an angle greater than 60 because of the azimuth contribution associated with the vertical striation curvature.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An optical system comprising:
a first array of independent axial optical elements having a first longitudinal axis; and
a second array of independent axial optical elements having a second longitudinal axis in electromagnetic communication with said first array of independent axial optical elements and relatively disposed such that said first and said second longitudinal axes are skew and such that multiple focal points are created for incoming parallel light;
wherein said first array comprises two films separated by fill material, and said second array comprises two films separated by fill material.

2. An optical system according to claim 1, wherein said first array of independent axial optical elements may have a profile selected from the following group:
sinusoidal; curved; baffled; flat, apex-forming; and non-uniform curved.

3. An optical system according to claim 1, wherein said second array of independent axial optical elements may have a profile selected from the following group:
sinusoidal; curved; baffled; flat, apex-forming; and non-uniform curved.

4. An optical system according to claim 1, wherein said first and said second optical arrays form a screen having a vertical fall-off intensity of less than 2% of peak energy per degree within the design viewer volume.

5. An optical system according to claim 4, wherein at the designed vertical angular cut-off point, the reflected light intensity falls off at the rate of between 20% and 50% per degree.

6. An optical system according to claim 1, wherein said first and said second optical arrays form a screen, and further comprising:
a plurality of vertical striation scattering profiles disposed on the surface of said screen.

7. An optical system according to claim 1, wherein said two films of said first array consists of a transparent film and a reflective film, and said two films of said second array consists of a transparent film and a reflective film.

8. An optical system according to claim 1, wherein said two films of said first array consists of two transparent films, and said two films of said second array consists of two transparent films.

9. An optical system comprising:
a first array of independent axial optical elements having a first longitudinal axis; and
a second array of independent axial optical elements having a second longitudinal axis in electromagnetic communication with said first array of independent axial optical elements and relatively disposed such that said first and said second longitudinal axes are skew and such that multiple focal points are created for incoming parallel light;
wherein said first and said second optical arrays form a screen having a plurality of cells, wherein the cellular (screen pixel) level of cross-talk experienced by the adjoining cells of said screen along the vertical and horizontal axes is between less than 1% and 5%, using screen-cell height/width ronchi rulings to independently measure vertical and horizontal cross-talk of individual cells based upon no less than a 100 screen pixel by 100 screen pixel contiguous area.

10. An optical system comprising:
a first array of independent axial optical elements having a first longitudinal axis; and
a second array of independent axial optical elements having a second longitudinal axis in electromagnetic communication with said first array of independent axial optical elements and relatively disposed such that said first and said second longitudinal axes are skew and such that multiple focal points are created for incoming parallel light;
wherein said first and said second optical arrays form a screen having a plurality of cells, wherein the modulation transfer of said screen is greater than 90% using ronchi-ruled images when the projected bar width equals the screen cell width, determined using a 100-pixel by 100-pixel sampling window with a 20-pixel slide in both horizontal and vertical directions over the entirety of the screen.

11. An optical system comprising:
a screen comprising a first array of independent axial optical elements having a first longitudinal axis, and a second array of independent axial optical elements having a second longitudinal axis joined to said first array such that said first and said second longitudinal axes are skew;
wherein said screen has a vertical fall-off intensity of less than 2% of peak energy per degree within the design viewer volume; and
wherein said first array comprises transparent film and reflective film separated by fill material, and said second array comprises transparent film and reflective film separated by fill material.

12. An optical system according to claim 11, wherein said first array of independent axial optical elements may have a profile selected from the following group:
sinusoidal; curved; baffled; flat, apex-forming; and non-uniform curved.

13. An optical system according to claim 11, wherein said second array of independent axial optical elements may have a profile selected from the following group:

sinusoidal; curved; baffled; flat, apex-forming; and non-uniform curved.

14. An optical system according to claim 11, wherein at the designed vertical angular cut-off point, the intensity of light reflected from said screen falls offal the rate of between 20% and 50% per degree.

15. An optical system comprising:

a screen comprising a first array of independent axial optical elements having a first longitudinal axis, and a second array of independent axial optical elements having a second longitudinal axis joined to said first array such that said first and said second longitudinal axes are skew;

wherein at the designed vertical angular cut-off point of said screen, the intensity of light reflected from said screen falls off at the rate of between 10% and 50% per degree; and wherein said first array comprises transparent film and reflective film separated by fill material, and said second array comprises transparent film and reflective film separated by fill material.

16. An optical system according to claim 15, wherein said first array of independent axial optical elements may have a profile selected from the following group:

sinusoidal; curved; baffled; flat, apex-forming; and non-uniform curved.

17. optical system according to claim 15, wherein said second array of independent axial optical elements may have a profile selected from the following group:

sinusoidal; curved; baffled; flat, apex-forming; and non-uniform curved.

18. An optical system according to claim 15, wherein said screen has a vertical fall-off intensity of less than 2% of peak energy per degree within the design viewer volume.

* * * * *